United States Patent
Chung et al.

(10) Patent No.: US 9,619,241 B2
(45) Date of Patent: Apr. 11, 2017

(54) DISPLAY DEVICE AND CONTROL METHOD OF DISPLAYING A PREDETERMINED SNAPSHOT IMAGE

(71) Applicant: LG ELECTRONICS INC., Seoul (KR)

(72) Inventors: Wooseong Chung, Seoul (KR); Jaehan Park, Seoul (KR); Chongsok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 14/477,142

(22) Filed: Sep. 4, 2014

(65) Prior Publication Data
US 2015/0301836 A1    Oct. 22, 2015

(30) Foreign Application Priority Data
Apr. 22, 2014 (KR) .................. 10-2014-0048101

(51) Int. Cl.
*G06F 15/177* (2006.01)
*G06F 9/44* (2006.01)
(Continued)

(52) U.S. Cl.
CPC .......... *G06F 9/4406* (2013.01); *G06F 9/4418* (2013.01); *G06F 12/023* (2013.01); *H04N 5/4403* (2013.01); *H04N 5/44513* (2013.01); *H04N 5/44543* (2013.01); *H04N 5/44582* (2013.01); *H04N 5/63* (2013.01);
(Continued)

(58) Field of Classification Search
CPC ..................................... G06F 9/4406
See application file for complete search history.

(56) References Cited

U.S. PATENT DOCUMENTS 7,480,791 B2 * 1/2009 Rothman .............. G06F 9/4418
                                                 711/156
7,624,260 B2 * 11/2009 Ethier ................... G06F 9/4403
                                                 713/1

(Continued)

FOREIGN PATENT DOCUMENTS

| EP | 1942658 A2 | 7/2008 |
|---|---|---|
| WO | WO 2005/027508 A1 | 3/2005 |
| WO | WO 2011/019176 A2 | 2/2011 |

*Primary Examiner* — Nitin Patel
(74) *Attorney, Agent, or Firm* — Birch, Stewart, Kolasch & Birch, LLP

(57) ABSTRACT

A method of controlling an operation of a display device is described. The display device includes a memory including a self-refresh memory block, a display module and a controller configured to control the operation of the display device. The controller is configured to receive a power-off signal, store a system booting file and a predetermined snapshot image in a self-refresh memory block based on a predetermined self-refresh mode, receive a power-on signal, boot a system by extracting the system booting file from the self-refresh memory block, and control the display module to display the predetermined snapshot image. A content is contiguously displayed by the display module when the power-off signal is received. An image configured by default is displayed by the display module after the power-on signal is received. A specific content is executed which is selected according to a user access frequency.

20 Claims, 26 Drawing Sheets

(51) Int. Cl.
  *G06F 12/02* (2006.01)
  *H04N 5/63* (2006.01)
  *H04N 5/44* (2011.01)
  *H04N 5/445* (2011.01)
  *H04N 21/443* (2011.01)
  *H04N 21/482* (2011.01)
(52) U.S. Cl.
  CPC ..... *H04N 21/4432* (2013.01); *H04N 21/4436* (2013.01); *H04N 21/482* (2013.01); *G06F 2212/251* (2013.01)

(56) References Cited

U.S. PATENT DOCUMENTS

| | | | |
|---|---|---|---|
| 8,341,391 B2* | 12/2012 | Choi | H04N 5/50 345/211 |
| 8,810,589 B1* | 8/2014 | Khoury | G09G 5/395 345/531 |
| 8,849,097 B2* | 9/2014 | Klappert | H04N 7/163 386/291 |
| 2007/0250730 A1 | 10/2007 | Reece et al. | |
| 2008/0001934 A1* | 1/2008 | Wyatt | G09G 3/3618 345/204 |
| 2008/0165288 A1* | 7/2008 | Miller | G06F 9/4403 348/725 |
| 2011/0016300 A1 | 1/2011 | Lee | |
| 2011/0055538 A1 | 3/2011 | Cho et al. | |
| 2011/0219225 A1* | 9/2011 | Yamazaki | G06F 1/24 713/100 |
| 2012/0320280 A1* | 12/2012 | Waites | H04N 21/4436 348/730 |
| 2012/0326846 A1* | 12/2012 | Tseng | G06K 7/10039 340/10.3 |
| 2013/0055035 A1* | 2/2013 | Nakatsu | G06F 11/0733 714/48 |
| 2015/0228235 A1* | 8/2015 | Davis | G09G 3/3611 345/214 |

* cited by examiner

FIG. 1
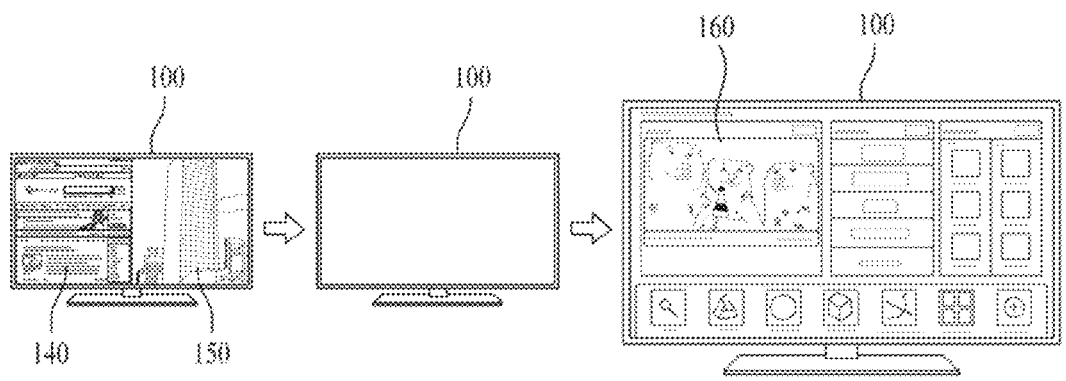
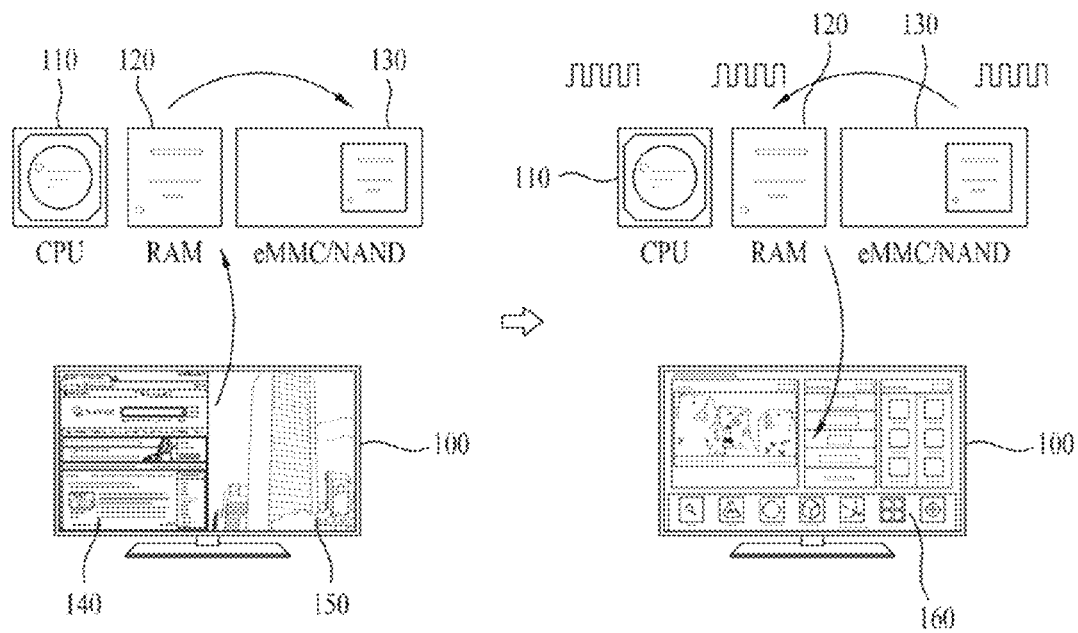

FIG. 7
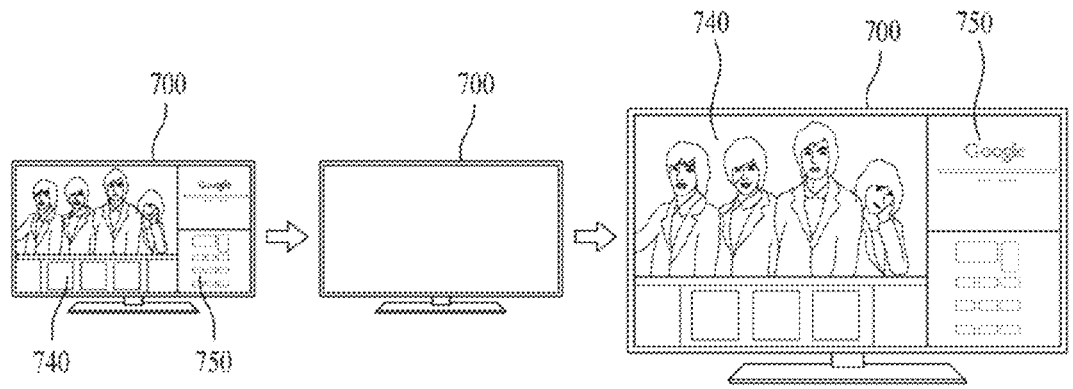
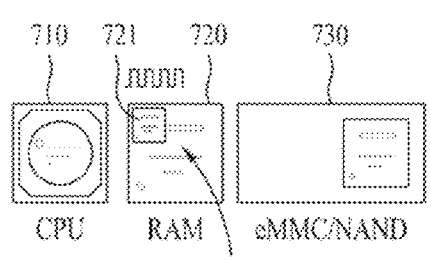
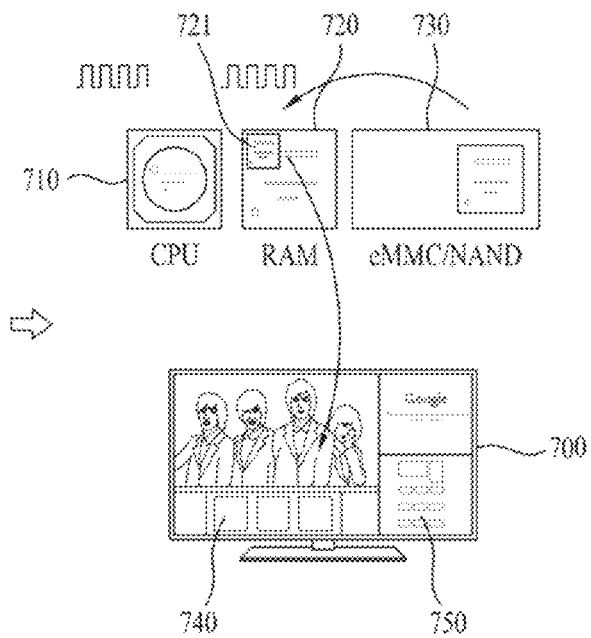

FIG. 8
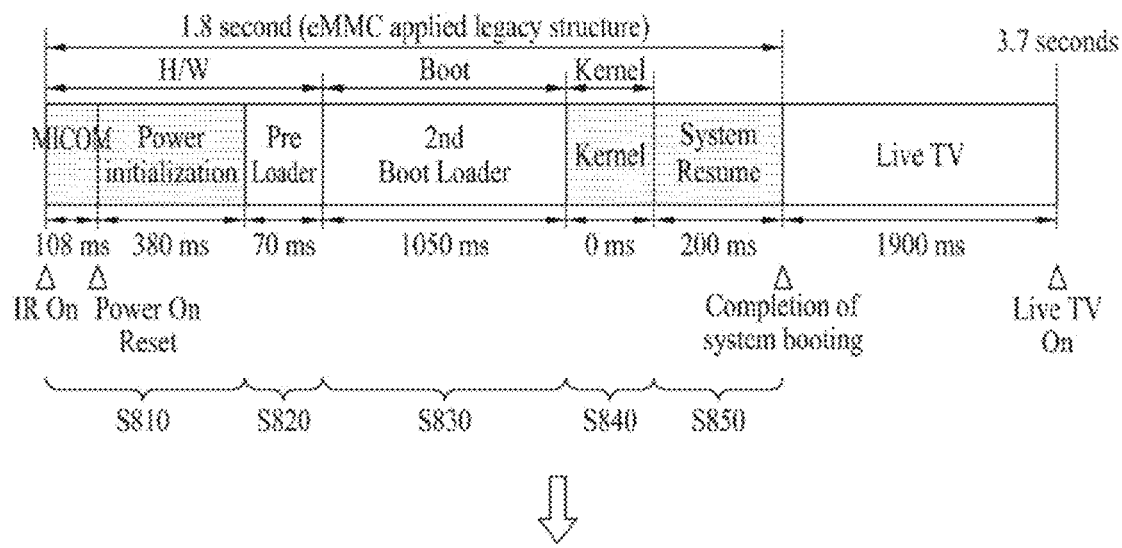
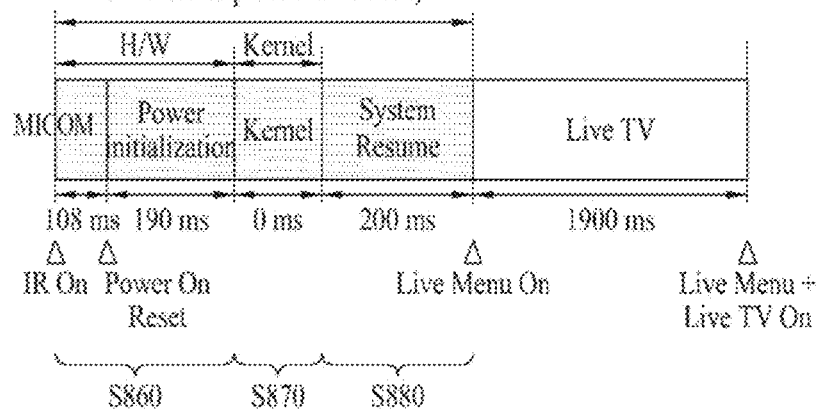

FIG. 12
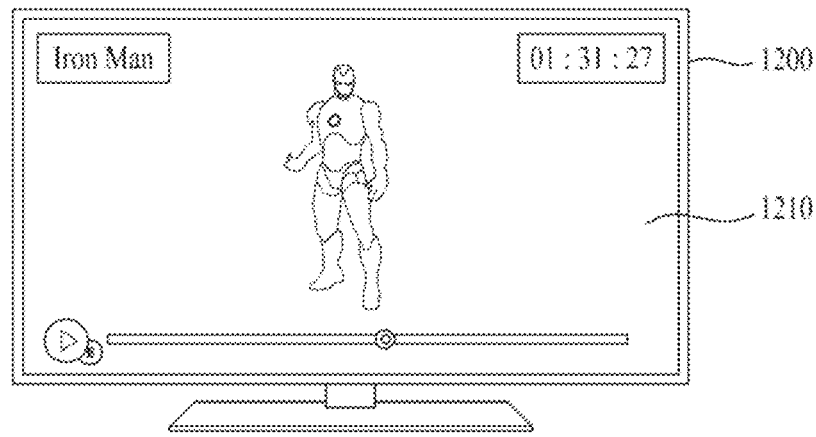
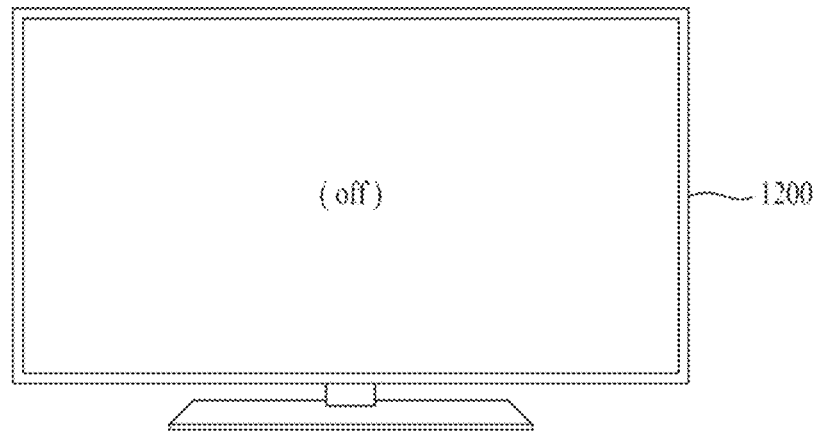
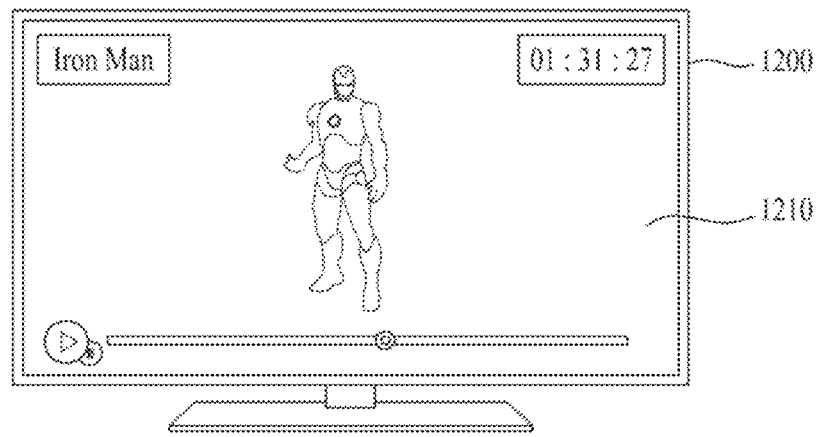

FIG. 13
(a)
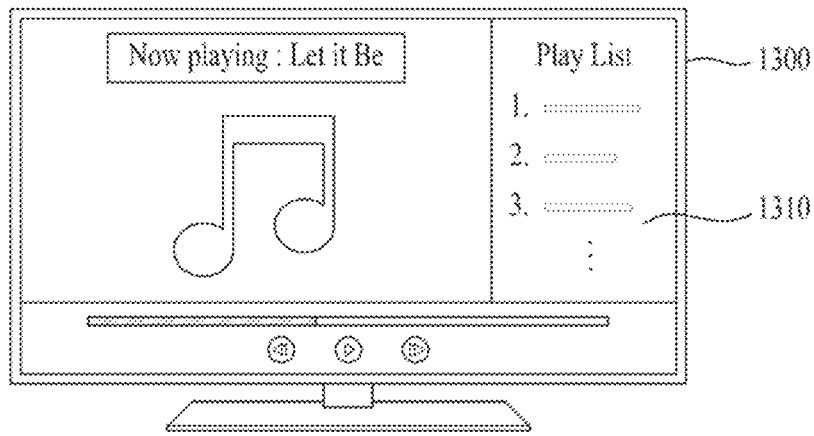
"Power off signal"
(b)
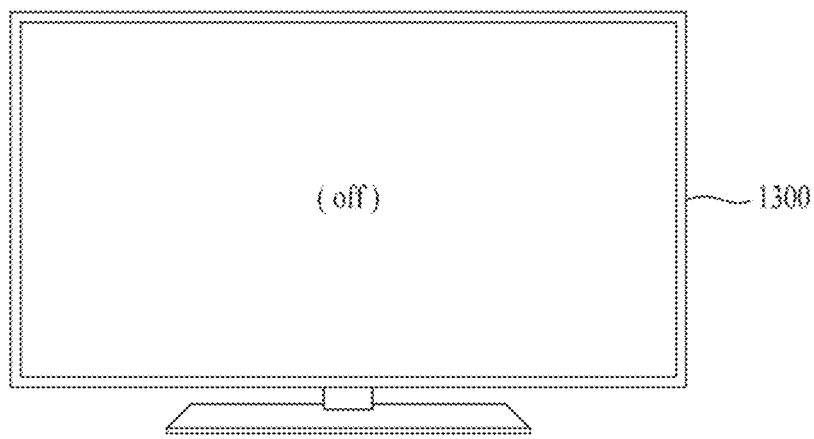
"Power on signal"
(c)
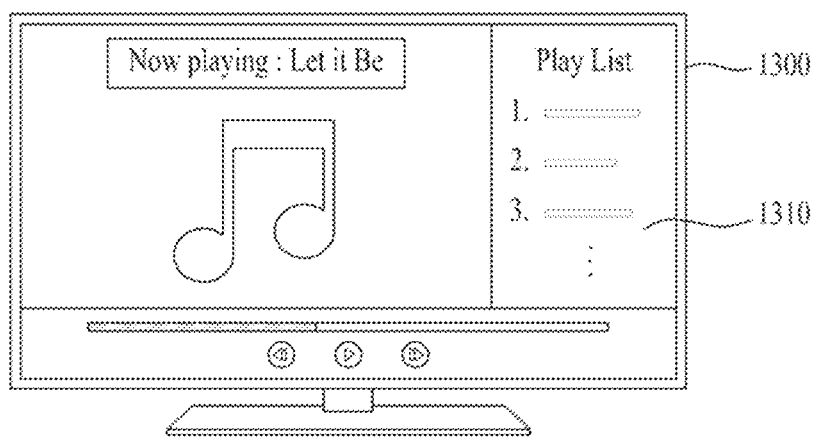

FIG. 14
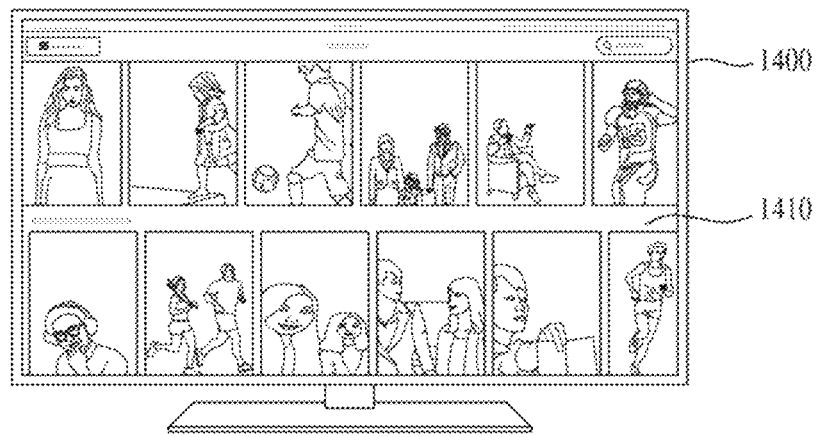
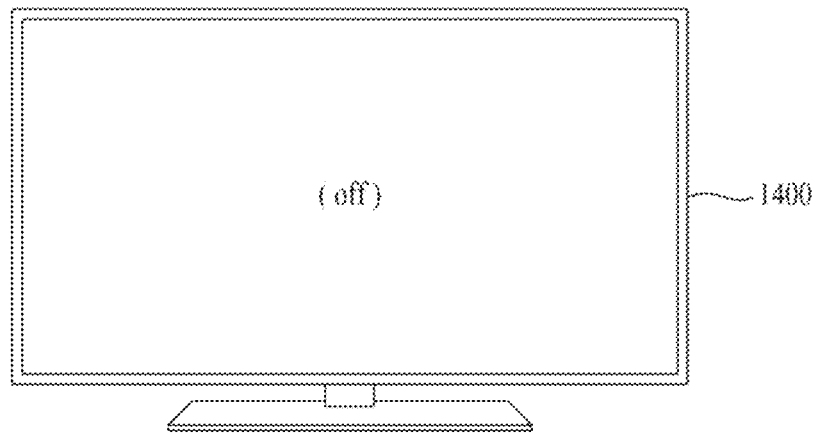
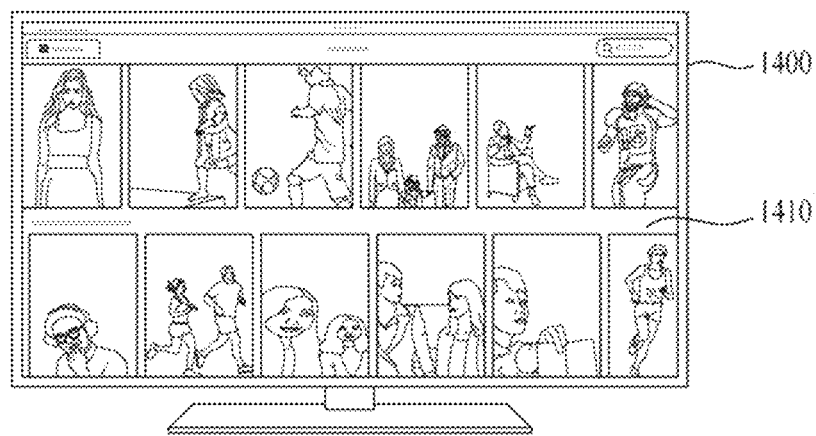

FIG. 15
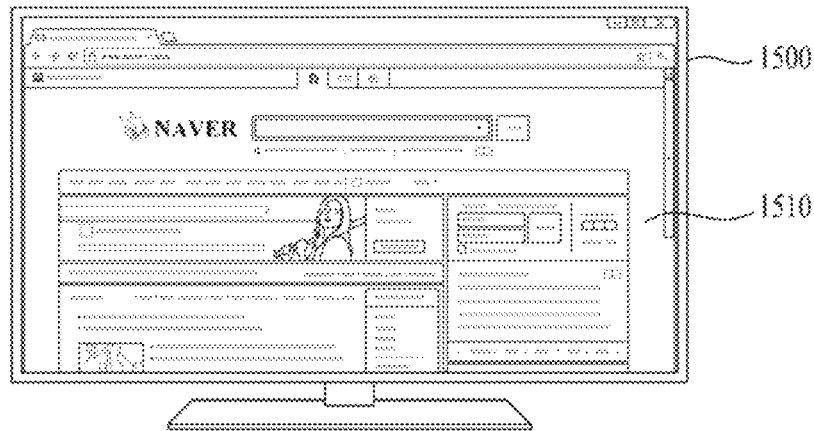
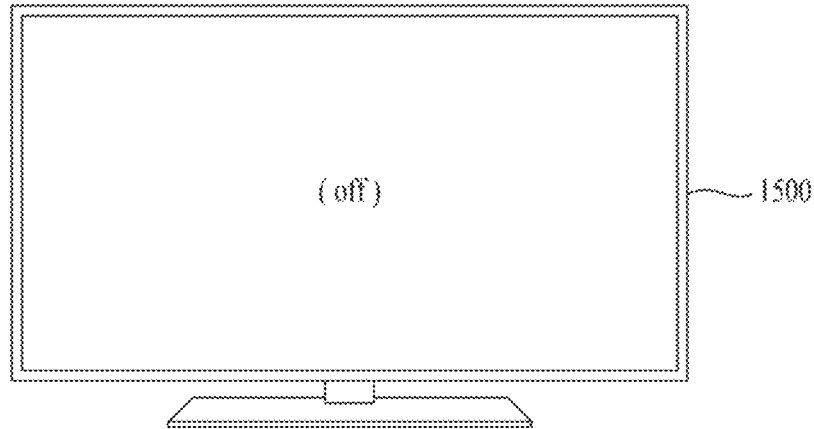
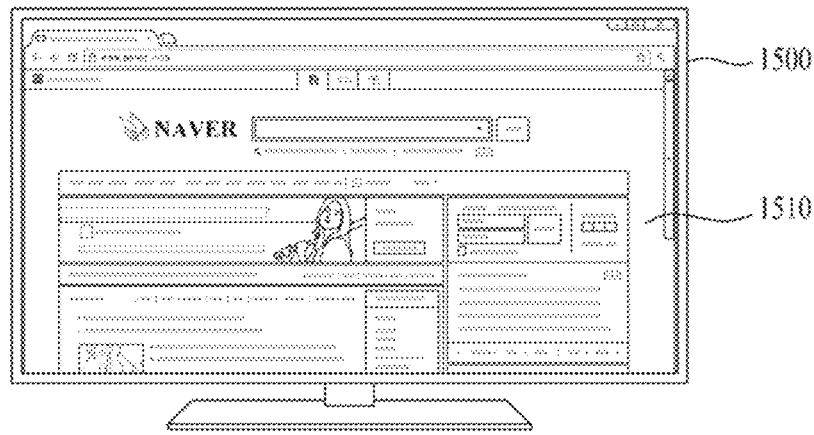

DISPLAY DEVICE AND CONTROL METHOD OF DISPLAYING A PREDETERMINED SNAPSHOT IMAGE

Pursuant to 35 U.S.C. §119(a), this application claims the benefit of the Korean Patent Application No. 10-2014-0048101, filed on Apr. 22, 2014, which is hereby incorporated by reference as if fully set forth herein.

BACKGROUND OF THE INVENTION

Field of the Invention

The present invention relates to a technology applicable to various display devices, and more particularly, to a display device designed to quickly display a specific screen according to a user configuration value after power of the display device is turned on while a prompt booting is simultaneously performed in the display device including a smart TV and the like and a method of controlling therefor.

Discussion of the Related Art

A display device receives a broadcast program via one or more tuners and can output the broadcast program in a screen. And, the display device can capture a user image using a camera and can detect an audio data via a microphone. And, the display device can perform a data communication with an external device using Bluetooth and the like. And, the display device can include a volatile memory and a non-volatile memory. For instance, the display device corresponds to a cellular phone, a smartphone, a computer, a tablet PC, a net hook, a TV (television), other broadcast receiving device and the like.

FIG. 1 is a diagram for explaining a booting operation of a legacy display device.

As depicted in FIG. 1, the display device 100 can include a control unit 110, a volatile memory 120 and a non-volatile memory 130. If a power-off signal is received, the control unit 110 of the display device may requires long booting standby time due to a booting file loaded to the volatile memory 120 from the non-volatile memory 130, long preparation time of a tuner to receive a real time broadcast program, slow operation (reading and writing) speed of a flash itself, an initial operation of a complicated smart screen and the like. Moreover, instead of contiguously displaying content data 140/150 used by a user after a power-on signal is received, when the power-off signal is received, the content data 140/150 is initialized by a predetermined default screen. Hence, due to the long standby time and many steps of complicated operations of a remote controller, user convenience is deteriorated.

SUMMARY OF THE INVENTION

Accordingly, the present invention is directed to an apparatus and method thereof that substantially obviate one or more problems due to limitations and disadvantages of the related art.

One technical task intended to achieve by an embodiment of the present invention is to reduce booting time of a display device in a manner of continuously activating a volatile memory by supplying separate power to a part of blocks of the volatile memory in case of receiving a power-off signal.

Another technical task intended to achieve by a different embodiment of the present invention is to reduce consumption of electrical power in a manner of separating a power domain between a memory block to which separate power is supplied and a remaining block.

Another technical task intended to achieve by a further different embodiment of the present invention is to increase user convenience in a manner of contiguously displaying content, which used to be watched by a user when a power-off signal is received, as it is after a prompt booting is performed.

The other technical task intended to achieve by a further different embodiment of the present invention is to specifically define a solution for increasing user convenience in a manner of quickly displaying a specific screen according to a user configuration value after a prompt booting is performed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a display device includes a memory including a self-refresh memory block, a tuner configured to receive a real time broadcast program, a reception unit configured to receive at least one of an infrared (IR) signal and a radio frequency (RF) signal from an external device, a display module, and a controller configured to control an operation of the display device. The controller is configured to receive a power-off signal, store a system booting file and a predetermined snapshot image in the self-refresh memory block based on a predetermined self-refresh mode, receive a power-on signal, boot a system by extracting the system booting file from the self-refresh memory block, and control the display module to display the predetermined snapshot image.

To further achieve these objects and other advantages and in accordance with the purpose of the invention, as embodied and broadly described herein, according to one embodiment, a method of controlling an operation of a display device includes receiving a power-off signal, storing a system booting file and a predetermined snapshot image in a self-refresh memory block based on a predetermined self-refresh mode, receiving a power-on signal, booting a system by extracting the system booting file from the self-refresh memory block, and controlling, by a controller, a display module in the display device to display the predetermined snapshot image.

According to one embodiment of the present invention, booting time of a display device can be reduced in a manner of continuously activating a volatile memory by supplying separate power to a part of blocks of the volatile memory in case of receiving a power-off signal.

According to a different embodiment of the present invention, consumption of electrical power can be reduced in a manner of separating a power domain between a memory block to which separate power is supplied and a remaining block.

According to a further different embodiment of the present invention, user convenience can be increased in a manner of contiguously displaying content, which used to be watched by a user when a power-off signal is received, as it is after a prompt booting is performed.

According to a further different embodiment of the present invention, solution for increasing user convenience can be specifically defined in a manner of quickly displaying a specific screen according to a user configuration value after a prompt booting is performed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram for explaining a booting operation of a legacy display device;

FIG. 7 is a diagram for explaining one example of performing a prompt booting operation using a self-refresh memory block performed by a display device according to one embodiment of the present invention;

FIG. 8 is a diagram for explaining a system booting process of a display device according to one embodiment of the present invention;

FIG. 12 is a diagram for explaining one example of contiguously displaying displayed second content after a power-on signal is received by a display device according to one embodiment of the present invention in case of receiving a power-off signal;

FIG. 13 is a diagram for explaining one example of contiguously displaying displayed third content after a power-on signal is received by a display device according to one embodiment of the present invention in case of receiving a power-off signal;

FIG. 14 is a diagram for explaining one example of contiguously displaying displayed fourth content after a power-on signal is received by a display device according to one embodiment of the present invention in case of receiving a power-off signal;

FIG. 15 is a diagram for explaining one example of contiguously displaying displayed fifth content after a power-on signal is received by a display device according to one embodiment of the present invention in case of receiving a power-off signal;

DETAILED DESCRIPTION OF THE INVENTION

In the following description, the present invention is explained in detail with reference to drawings.

A suffix 'module' and 'unit' for a composing element in the following description is simply used for clarity of writing the present specification. Thus, the 'module' and the 'unit' can be used in a manner of being mixed.

Moreover, while the embodiments of the present invention have been concretely described with reference to the attached diagrams and the contents written on the diagrams, the present invention may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Figure 2:
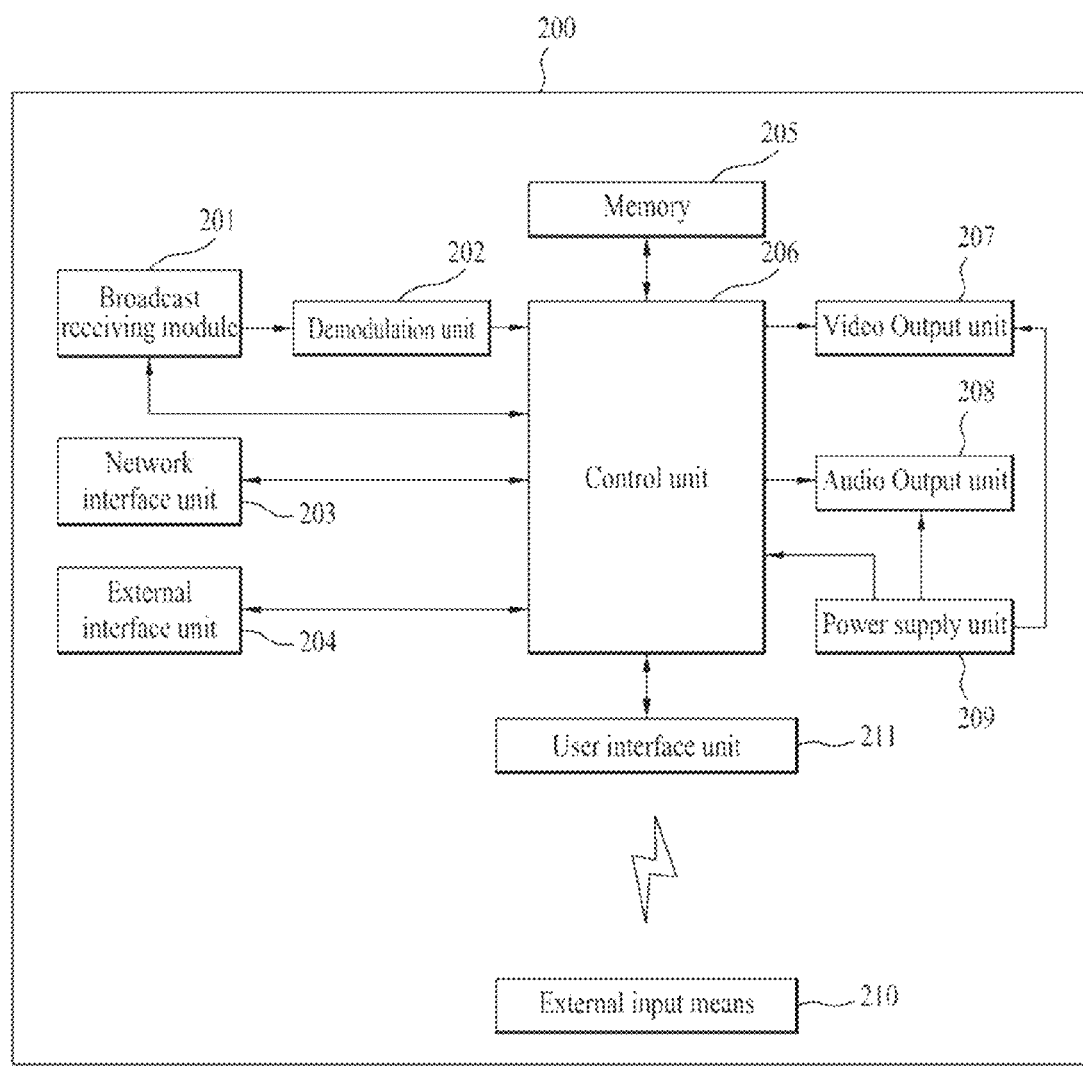
FIG. 2 is a block diagram concretely showing configuration elements of a display device according to one embodiment of the present invention.

FIG. 2 is a block diagram concretely showing configuration elements of a display device according to one embodiment of the present invention. As depicted in FIG. 2, a display device 200 according to one embodiment of the present invention includes a broadcast reception module 201, a demodulation unit 202, a network interface unit 203, an external device interface unit 204, a memory 205, a control unit 206, a video output unit 207, an audio output unit 20$, a power supply unit 209, an external input means 210, a user interface unit 211 and the like. Meanwhile, the display device 200 is designed to perform data communication with a remote controller, a mobile device and a keyboard corresponding to the external input means 210. As an example, the external input means is explained as a remote controller in the following description. Regarding the remote controller, it shall be described in detail with reference to FIG. 4 and FIG. 5.

For instance, the broadcast reception module 201 can be designed by an RF tuner or an interface receiving broadcast data from such an external device as an STB and the like. For instance, the broadcast reception module 201 can receive an RF broadcast signal of a single carrier according to an ATSC (advanced television system committee) scheme or an RF broadcast signal of a plurality of carriers according to a DVB (digital video broadcasting scheme.

The demodulation unit 202 performs a demodulation operation by receiving a digital IF signal (DIF) converted by the broadcast reception module 201. For instance, if the digital IF signal outputted from the broadcast reception module 201 corresponds to a signal according to the ATSC scheme, the demodulation unit 202 performs 8-VSB (8-vestigal side band) demodulation for example. And, the demodulation unit 202 may perform channel decoding.

The external device interface unit 204 corresponds to an interface enabling data communication between an external device and the display device 200. The external device interface unit 204 can access such an external device as a DVD (digital versatile disk), Bluray, a gaming device, a camera, a camcorder, a computer (notebook), an STB and the like in wired/wireless. The external device interface unit 204 delivers an image, an audio or a data signal inputted from external to the control unit 206 via a connected external device. And, the external device interface unit 204 can output the image, the audio or the data signal processed by the control unit 206 to the external device. For instance, the external device interface unit 204 can include a USB terminal, a CVBS (composite video banking sync) terminal, a component terminal, an S-video terminal (analog), a DVI (digital visual interface) terminal, a HDMI (high definition multimedia interface) terminal, an RGB terminal, a S-SUB terminal and the like.

The network interface unit 203 provides an interface used for connecting the display device 200 with a wired/wireless network including the internet. The network interface unit 203 can be equipped with an Ethernet terminal and the like to access a wired network. And, the network interface unit 203 may use such a communication standard as WLAN (wireless LAN) (WiFi), Wibro (wireless broadband), Wimax (world interoperability for microwave access), HSDPA (high speed downlink packet access) and the like to access a wireless network. The network interface unit 203 can transmit or receive data with a different user or a different device via an accessed network or a different network linked with the accessed network.

The memory 205 can store a program for processing and controlling each signal in the control unit 206, a signal-processed image, an audio, or a data signal. And, the memory 105 may perform a function of temporarily storing an image, an audio, or a data signal inputted from the external device interface unit 204 or the network interface unit 203. Moreover, the memory 205 can store various OS, a middleware and a platform for example.

The user interface unit 211 delivers a signal inputted by a user to the control unit 206 or transmits a signal received from the control unit 206 to an external device (e.g., the remote controller 210). For instance, the user interface unit 211 is designed to receive such a control signal as power on/off, channel selection, screen setting and the like from the remote controller 210 according to various communication schemes such as a radio frequency (RF) communication scheme, an infrared (IR) communication scheme, and the like, and process them. Or, the user interface unit 211 is designed to transmit a control signal received from the control unit 206 to the remote controller 210.

The control unit 206 demultiplexes a stream inputted via the broadcast reception module 201, the demodulation unit 202, the network interface unit 203, or the external device interface unit 204, processes demultiplexed signals, and may be then able to generate and output a signal used for outputting a video or an audio. Regarding the control unit 206, it shall be explained in more detail with reference to FIG. 3.

The video output unit 207 generates an actuation signal in a manner of converting a video signal, a data signal, an OSD signal processed in the control unit 206 or a video signal, a data signal and the like received by the external device interface unit 204 to R, G, and B signal, respectively. The video output unit 207 may correspond to a PDP, a LCD, an OLED, a flexible display, a 3D display or the like.

The audio output unit 208 receives a signal audio-processed in the control unit 106, e.g., a stereo signal, a 3.1 channel signal, or a 5.1 channel signal, and outputs the signal as an audio. The audio output, unit 208 can be implemented by a speaker of various forms.

The power supply unit 209 supplies power to the overall display device 200. In particular, the power supply unit can supply power to the control unit 206 implementable by a form of system on chip (SOC), the video output unit 207 configured to display a video and the audio output unit 208 configured to output an audio.

Figure 3:
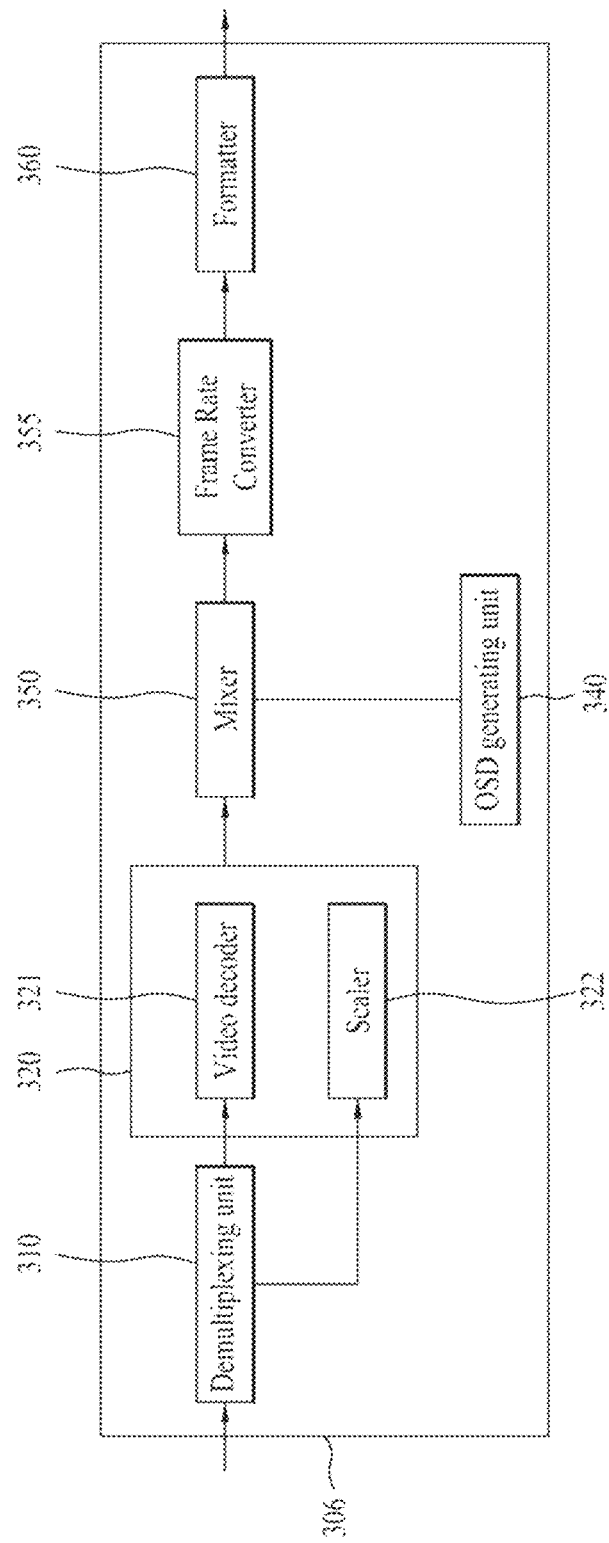
FIG. 3 is a block diagram concretely showing a control unit depicted in FIG. 2.

FIG. 3 is a more detail block diagram for a control unit depicted in FIG. 2. As depicted in FIG. 3, the control unit 306 of the display device includes a demultiplexing unit 310, a video processing unit 320, an OSD generating unit 340, a mixer 350, a frame rate converter 355, a formatter 360, and the like. And, the control unit 306 can be designed to further include an audio processing unit (not depicted) and a data processing unit (not depicted).

The demultiplexing unit 310 demultiplexes an inputted stream. For instance, if MPEG-2 TS is inputted, the demultiplexing unit demultiplexes the MPEG-2 TS and may be then able to divide the MPEG-2 TS into a video, an audio, and a data signal, respectively.

The video processing unit 320 can perform a video processing for a demultiplexed video signal. To this end, the video processing unit 320 can be equipped with a video decoder 321 and a scaler 322. The video decoder 321 decodes the demultiplexed video signal and the scaler 322 performs scaling to enable the video output unit to output resolution of the decoded video signal. The video signal decoded in the video processing unit 320 is inputted to the mixer 350.

The OSD generating unit 340 generates an OSD signal according to a user input or by itself. Hence, the mixer 350 can mix the OSD signal generated by the OSD generating unit 340 and the decoded video signal, which is video-processed in the video processing unit 320. The mixed signal is provided to the formatter 360. When the decoded broadcast video signal or an external input signal is mixed with the OSD signal, an OSD can be displayed on a broadcast video or an external input video in a manner of being overlaid.

The frame rate converter (FRC) 355 can convert a frame rate of an inputted video. For instance, the frame rate converter 355 converts a frame rate of 60 Hz to a frame rate of 120 Hz or 240 Hz.

And, the formatter 360 receives an output signal of the frame rate converter 355 and outputs the signal in a manner of modifying a format of the signal to make the signal suitable for the video output unit. For instance, the formatter can Output R, G, and B data signal. The R, G, and B data signal can be outputted as a low voltage differential signaling (LVDS) or a mini-LVDS.

Figure 4:
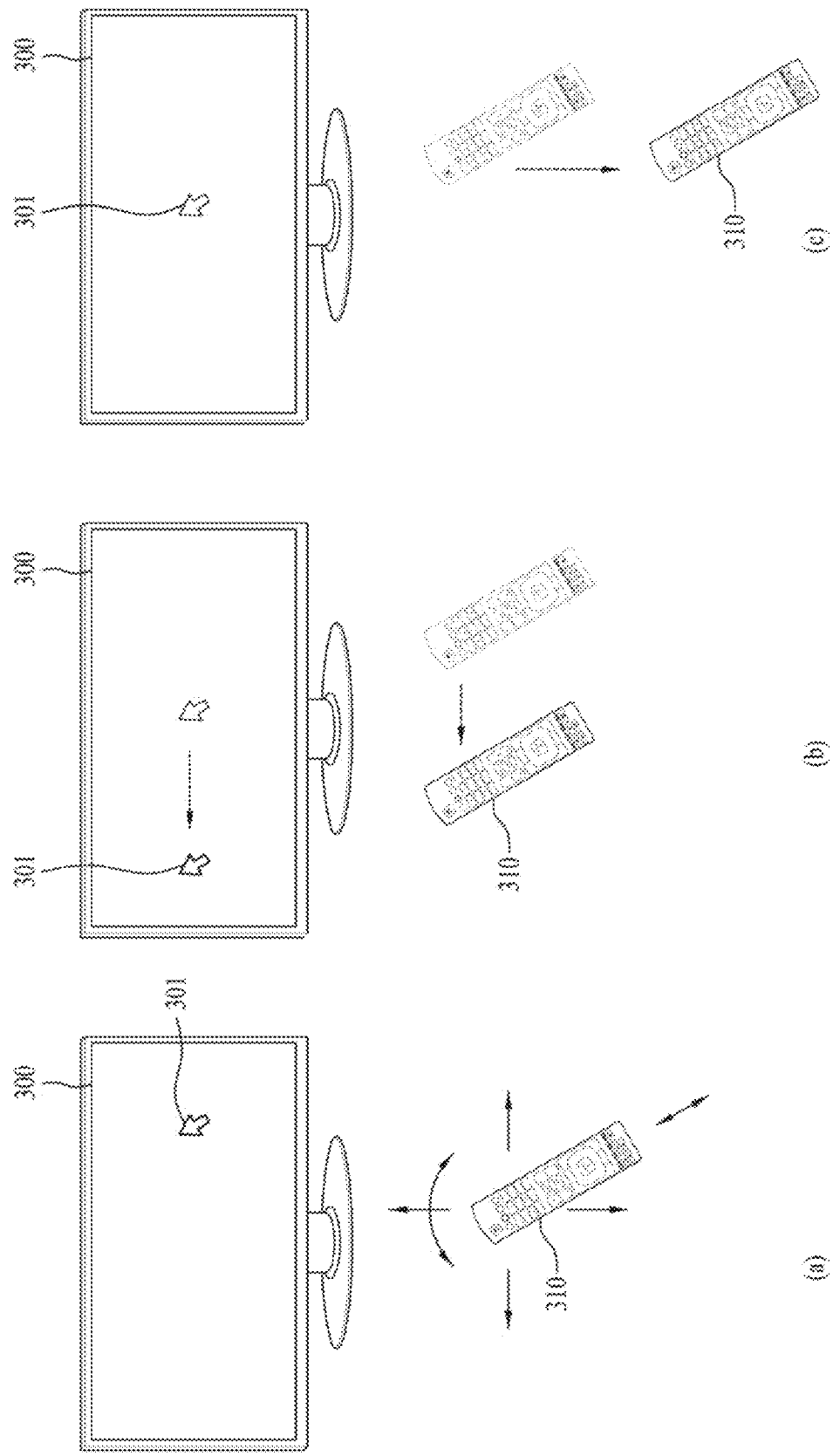
FIG. 4 is a diagram for an exterior of a remote controller according to one embodiment of the present invention.

FIG. 4 is a diagram for an exterior of a remote controller according to one embodiment of the present invention. As depicted in FIG. 4(a), a pointer 401, which corresponds to a movement of a remote controller 410, is displayed on a screen of a display device 400. A user can move the remote controller 410 left and right (FIG. 4(b)) and top and bottom (FIG. 4(c)) or rotate the remote controller. Since the pointer 401 is displayed on the screen according to the movement of the remote controller in a 3D space, the remote controller 410 may be named as a space remote controller. As depicted in FIG. 4(b), when a user moves the remote controller 410 to the left, the pointer 401 displayed on the screen of the display device 400 moves to the left as well. Meanwhile, information on the movement of the remote controller 410 detected by a sensor of the remote controller 410 is transmitted to the display device 400. The digital display device 400 can calculate a coordinate of the pointer 401 from the information on the movement of the remote controller 410. The display device 400 is designed to display the pointer 401 corresponding to the calculated coordination. Meanwhile, as depicted in FIG. 4(c), when a user moves the remote controller 410 to the bottom, the pointer 401 displayed on the screen of the display device 400 moves to the bottom as well. Hence, a specific area within the screen of the display device 400 can be promptly selected by a user using the remote controller 410 according to one embodiment of the present invention.

Figure 5:
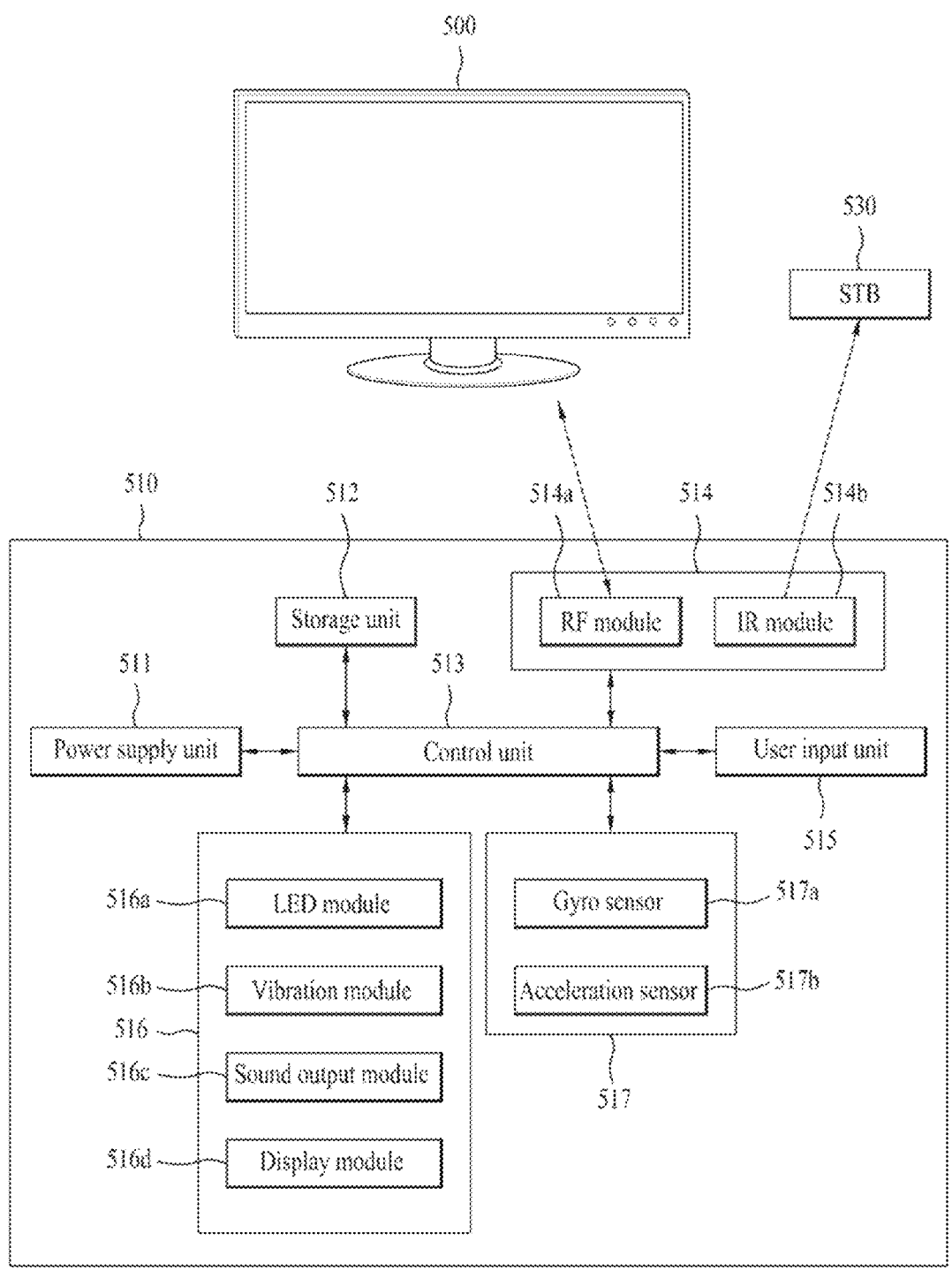
FIG. 5 is a block diagram concretely showing configuration elements of a remote controller depicted in FIG. 4.

FIG. 5 is a detail block diagram for components of a remote controller depicted in FIG. 4. As depicted in FIG. 5, a remote controller 510 includes a radio communication unit 514, a user input unit 515, a sensor unit 517, an output unit 516, a power supply unit 511, a storing unit 512, a control unit 513, and the like.

The radio communication unit 514 is designed to enable a communication to be performed with a random external device. In particular, according to one embodiment of the present invention, an RF module 514a is designed to perform a data communication with the display device 500 and an IR module 514b is designed to perform an IR communication with an external electronic device 530 (e.g., STB). Hence, it is possible to make the remote controller 510 play a role of a relay, which forwards an IR code value received from the display device 500 to the STB 530. Moreover, according to one embodiment of the present invention, the remote controller 510 transmits a signal including information on the movement of the remote controller 510 and the like to the display device 500 via the RF module 514a. And, the remote controller 510 can receive a signal transmitted by the display device 500 via the RF module 514a. The remote controller 510 can transmit a command on power on/off, channel change, volume adjustment and the like to the display device 500 via the IR module 514b if necessary.

The user input unit 515 consists of a key pad, a button, a touch pad, a touch screen, and the like.

The sensor unit 517 can be equipped with a gyro sensor 517a or an acceleration sensor 517b. The gyro sensor 517a can sense information on a movement of the remote controller 510. As an example, the gyro sensor 517a can sense the information on the movement of the remote controller 510 on the basis of x, y, and z axis. The acceleration sensor 517b can sense information on a moving speed of the remote controller 510 and the like. Meanwhile, the sensor unit 517 may be further equipped with a distance measuring sensor. The distance measuring sensor can sense a distance between the display device 500 and the remote controller.

The output unit 516 can output a video or an audio signal corresponding to an operation of the user input unit 515 or a signal transmitted by the display device 500. As an example, the output unit 516 can be equipped with a LED module, which is lighted when the user input unit 515 is operated or a signal is transceived with the display device via the radio communication unit 514, a vibration module 516b generating a vibration, a sound output module 516c outputting a sound, or a display module 516d outputting a video.

The power supply unit 511 supplies power to each component of the remote controller 510. If the remote controller 510 does not move for a prescribed time, the power supply unit 511 stops supplying the power to the remote controller, thereby reducing power waste.

The storing unit 512 can store a program, an application data, and the like of various types necessary to control or operate the remote controller 510. And, the control unit 513 controls various matters related to a control of the remote controller 510. For instance, the control unit 513 can transmit a signal corresponding to a prescribed key operation of the user input unit 515 or a signal corresponding to a movement of the remote controller 510 sensed by the sensor unit 517 to the display device 500 or the STB 530 via the radio communication unit 514.

Figure 6:
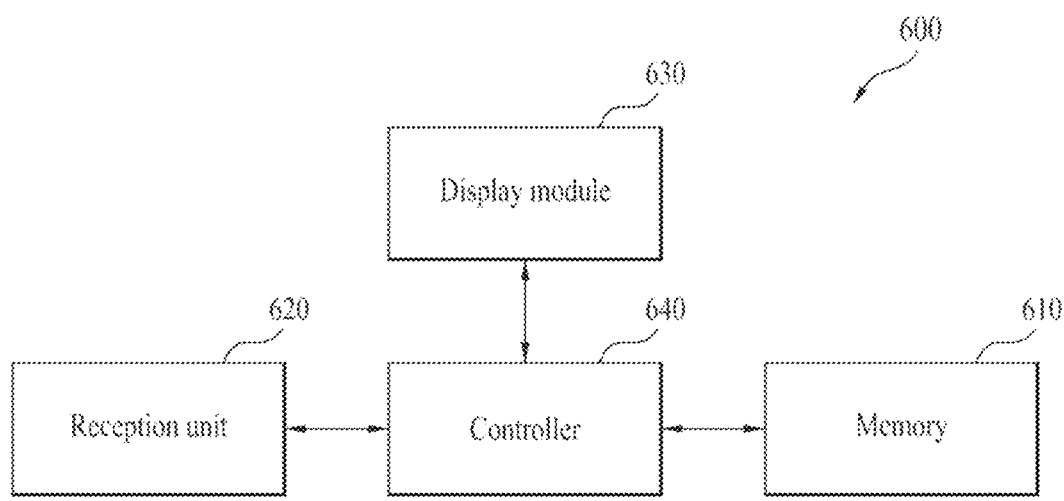
FIG. 6 is a block diagram concretely showing configuration elements of a display device according to a different embodiment of the present invention.

FIG. 6 is a detail block diagram of configuration elements of a display device according to a different embodiment of the present invention. A part of modules of the display device depicted in FIG. 6 can be added or modified with reference to the aforementioned FIG. 1 to FIG. 5. The scope of right of the present invention is not determined by the element shown in FIG. 1 to FIG. 6. Instead, the scope of right of the present invention should be basically comprehended by items written on the claims. As depicted in FIG. 6, a display device 600 according to a different embodiment of the present invention can include a memory 610, a reception unit 620, a display module 630, a controller 640, and the like.

The memory 610 can include a volatile memory and a non-volatile memory. The volatile memory may correspond to a DRAM (dynamic random access memory). The non-volatile memory can include a Nand Flash Memory and an eMMC (embedded Multi Media Card). A memory of the display device 600 can include a self-refresh memory block. Regarding the self-refresh memory block, it shall be described in detail with reference to FIG. 7. The memory 610 may correspond to the memory 205 depicted in FIG. 2.

The reception unit 620 can receive a key input signal from an external input means. The external input means may correspond to the remote controller mentioned earlier in FIG. 4 to FIG. 5. And, the external input means may correspond to a mobile device or a keyboard. The key input signal can be received by such various communication schemes as an RF communication scheme, an IR communication scheme and the like. And, the external input means can transmit/receive data in a manner of being paired with the display device. The reception module 620 may correspond to the user interface unit 211 mentioned earlier in FIG. 2.

The display module 630 can display one or more broadcast programs or contents in a screen. The display module 630 may correspond to the output unit 207 mentioned earlier in FIG. 2.

The controller 640 performs a function of generally managing one or more modules depicted in FIG. 6 including the reception module 620, the display module 630 and the like. Regarding the controller, it shall be described in detail with reference to FIG. 7 to FIG. 26 in the following.

FIG. 7 is a diagram for explaining one example of performing a prompt booting operation using a self-refresh memory block by a display device according to one embodiment of the present invention.

A controller 710 of the display device 700 according to one embodiment of the present invention can control to receive a power-off signal, capture an image of content displayed in a screen when the power-off signal is received, store a system booting file and the captured image in a self-refresh memory block of the memory, receive a power-on signal, boot a system by extracting the system booting file from the self-refresh memory block and display the captured image in the screen.

The self-refresh memory block may correspond to a memory block activated by receiving a separate power when power of the display device is turned off.

The memory can include a DRAM (dynamic random access memory), a nand flash memory and an eMMC (embedded multi media card). And, the self-refresh memory block can be included in the DRAM.

As depicted in FIG. 7, if a power-off signal is received via an external input means and the like, the controller 710 of the display device 700 according to one embodiment of the present invention can control to capture content image displayed in a screen when the power-off signal is received. And, the controller can control the captured image and the system booting file to be stored in the self-refresh memory block 721, which is included not in the non-volatile memory 730 but in the volatile memory 720. The self-refresh memory block 721 may correspond to a memory block included in the volatile memory 720. The self-refresh memory block 721 can be activated by being supplied by separate power when power of the display device 700 is turned off or the display device is in a stand-by state. In particular, the volatile memory 720 included in the display device 700 according to one embodiment of the present invention includes a memory block to which a power supply is simultaneously terminated when the power of the display device 700 is turned off and a memory block, i.e., the self-refresh memory block 721, which is activated by a separate power supply when the power of the display device 700 is turned off. And, if a power-on signal is received from an external input means and the like, the controller 710 of the display device 700 according to one embodiment of the present invention can control the display device 700 to be booted in a manner of extracting the system booting file used for booting the system of the display device 700 from the self-refresh memory block 721 instead of the non-volatile memory 730. In particular, unlike a relate art mentioned earlier in FIG. 1, when a power-on signal is received, the display device 700 according to one embodiment of the present invention moves the system booting file and the like to the volatile memory 720 from the non-volatile memory 730, eliminates such a complicated process as reading the system boating file and the like from the volatile memory 720 and supplies separate power to the volatile memory 720 to make the self-refresh memory block 721 to be always activated. By doing so, a system booting process can be promptly performed when the power-on signal is received.

And, as depicted in FIG. 7, the controller 710 of the display device 700 according to one embodiment of the present invention extracts an image, which is captured from a content image 740/750 displayed in a screen when the power-off signal is received, from the self-refresh memory block 721 when the power-on signal is received and may be then able to control the captured image to be displayed in the screen immediate after a system booting is completed. Moreover, if the power-on signal is received, the controller 710 of the display device 700 according to one embodiment of the present invention can contiguously execute the content 740/750, which is displayed when the power-off signal is received, from the timing that the power-off signal is received. Regarding this, it shall be described in detail with reference to FIG. 11 to FIG. 15.

By designing the display device as mentioned in FIG. 7, when a power-off signal is received, a system booting file, an image and content data are stored in the self-refresh memory block of the volatile memory instead of the non-volatile memory. By doing so, consumption of electrical power can be minimized. At the same time, a system booting process and a content execution returning process can be promptly performed when a power-on signal is received.

FIG. 8 is a diagram for explaining a system booting process of a display device according to one embodiment of the present invention.

An example of performing a system booting process using a legacy non-volatile memory is explained with reference to FIG. 8(a). As depicted in FIG. 8(a), if a MICOM in a power-off display device receives a power-on signal via an IR signal and the like, a power initialization process is performed [S810]. And the display device performs a pre loader process [S820]. The pre loader process may correspond to a process of loading a system booting file and the like to a volatile memory such as a DRAM from a non-volatile memory such as a flash memory. If the pre loader process is completed, the display device performs a second boot loader process [S830]. The second boot loader process may correspond to a process of loading application data including a snapshot image such as an image captured when a power-off signal is received and the like to the volatile memory from the non-volatile memory. If the second boot loader processor is completed, the display device performs a verification process of a kernel [S840] and performs a system resume process to wake up all device drivers included in the display device [S850]. When the system resume process is performed, a system booting is completed. According to the legacy display device, it takes about 1.8 second from timing of receiving a power-on signal from an external input means such as the IR signal to timing of completing a system booting.

On the contrary, as depicted in FIG. 8(b), if a power-off signal is received, the display device according to one embodiment of the present invention stores the system booting file and the like in a self-refresh memory block within the volatile memory to which separate power is supplied instead of the volatile memory. And then, if a power-on signal is received, the display device performs a system booting process in a manner of extracting the system booting file and the like from the self-refresh memory block. Since the display device is designed to perform as mentioned in the foregoing description, the pre loader process and the second boot loader process can be eliminated from the system booting process of the legacy display device described in FIG. 8(a). Hence, in order for the display device according to one embodiment of the present invention to complete the system booting process, the system booting process can be completed when the step of initializing power after the MICOM receives the power-on signal [S860], the verification process of the kernel [S870] and the system resume process [S880] are performed only. Hence, if the self-refresh memory block is used according to the present invention, time taken for completing the system booting process after the power-on signal is received can be reduced to less than a second.

Figure 9:
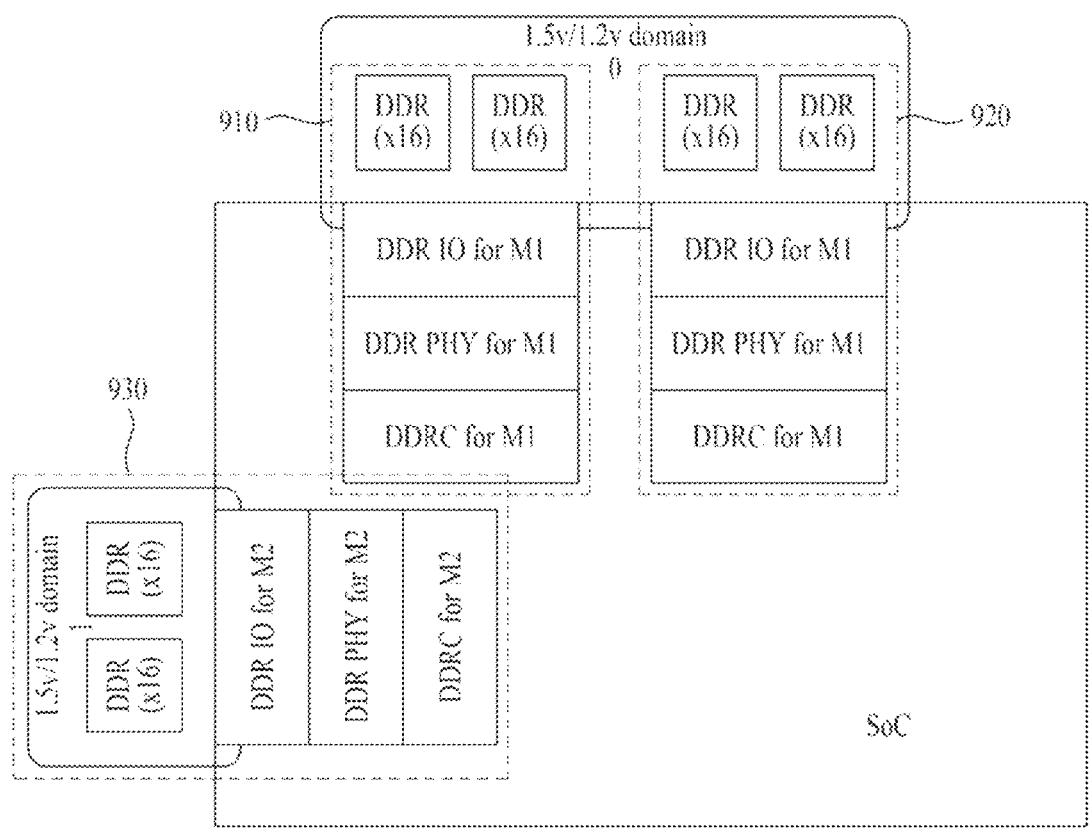
FIG. 9 is a diagram for explaining one example of separating a power domain of a self-refresh memory block from a power domain of a different memory block of a display device according to one embodiment of the present invention.

FIG. 9 is a diagram for explaining one example of separating a power domain of a self-refresh memory block from a power domain of a different memory block of a display device according to one embodiment of the present invention.

As depicted in FIG. 9, the display device according to one embodiment of the present invention can be designed to make power domains of a volatile memory to be separated from each other. The volatile memory may correspond to a DRAM. For instance, as depicted in FIG. 9, the display device may include 3 DRAMs 910/920/930. Among the 3 DRAMs 910/920/930, a first DRAM and a second DRAM 910/920 may be tied up with an identical power domain and a third DRAM 930 may have a different power domain. In this case, the third DRAM 930 may correspond to a self-refresh memory block. As depicted in FIG. 9, in case of separating a power domain, when power of the display device is turned off, power of the first DRAM and power of the second DRAM 910/920 are also turned off since power supply is terminated. Yet, since the third DRAM 930 is supplied by separate power, the third DRAM 930 can maintain a power-on state. Hence, although the display device is in a power-off state, the third DRAM 930 can be continuously activated in the power-on state. Hence, if a system booting file, image data and the like are stored in the third DRAM 930, a prompt system booting process can be performed when the power of the display device is turned on.

Figure 10:
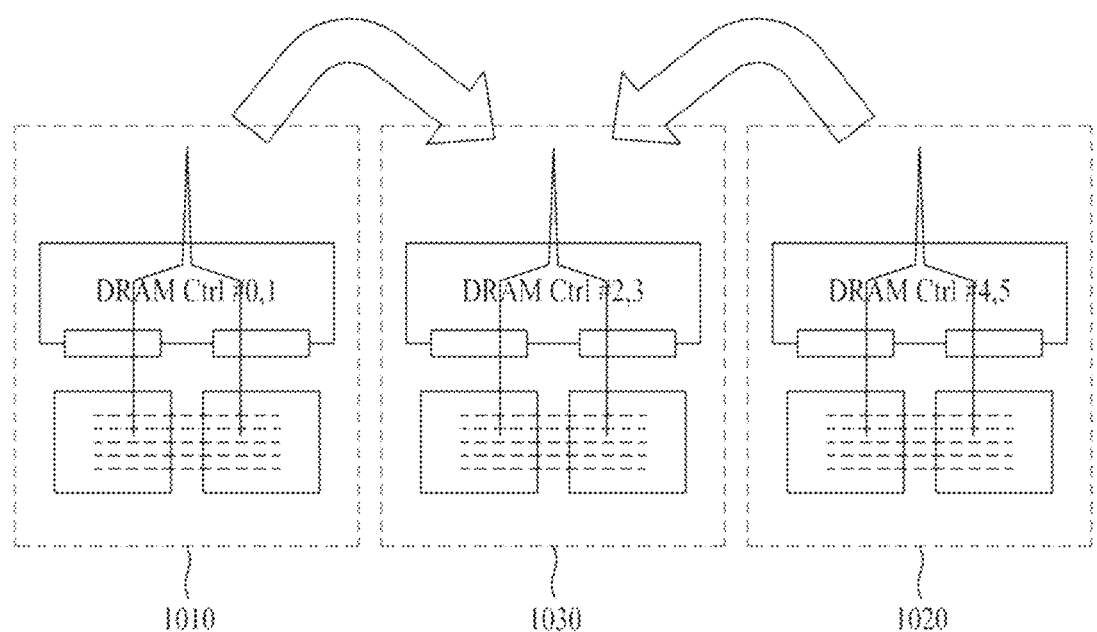
FIG. 10 is a diagram for explaining one example of performing a memory interleaving process by a display device according to one embodiment of the present invention.

FIG. 10 is a diagram for explaining one example of performing a memory interleaving process by a display device according to one embodiment of the present invention.

The display device according to one embodiment of the present invention can perform a memory interleaving process between DRAMs corresponding to volatile memories. The memory interleaving is performed to enhance approaching speed of the DRAM, which is a volatile memory. The memory interleaving is a method of simultaneously approaching to a plurality of places in a manner of placing memory positions adjacent to each other to banks different from each other. As depicted in FIG. 10, the display device according to one embodiment of the present invention can include a first DRAM 1010, a second DRAM 1020 and a third DRAM 1030. And, the first DRAM, the second DRAM 1020 and the third DRAM 1030 can be equipped with 2 DRAM controllers. And, as depicted in FIG. 10, if a power-off signal is received, the display device according to one embodiment of the present invention can control data situating at the first DRAM 1010 and the second DRAM 1020 to be transmitted to the third DRAM 1030. In this case, the third DRAM 1030 may correspond to the self-refresh memory block to which separate power is supplied mentioned earlier in FIG. 9. If all of the data situating at the first DRAM 1010 and the second DRAM 1020 are transmitted to the third DRAM 1030, power supply to the first DRAM 1010 and the second DRAM 1020 is terminated and all of the data stored in the first DRAM and the second DRAM are deleted while the first DRAM 1010 and the second DRAM 1020 are deactivated at the same time. On the contrary, although the power supply to the display device is terminated, the third DRAM 1030 is activated since a separate power is supplied to the third DRAM. Hence, the data transmitted from the first DRAM 1010, the data transmitted from the second DRAM 1020 and data stored in the third DRAM 1030 are not deleted and can be continuously stored in the third DRAM 1030. Moreover, a memory capacity of the self-refresh memory block may occupy ⅓ of the memory capacity of the total DRAMs. Hence, by performing the aforementioned process, the display device according to one embodiment of the present invention can perform a prompt booting process.

Figure 11:
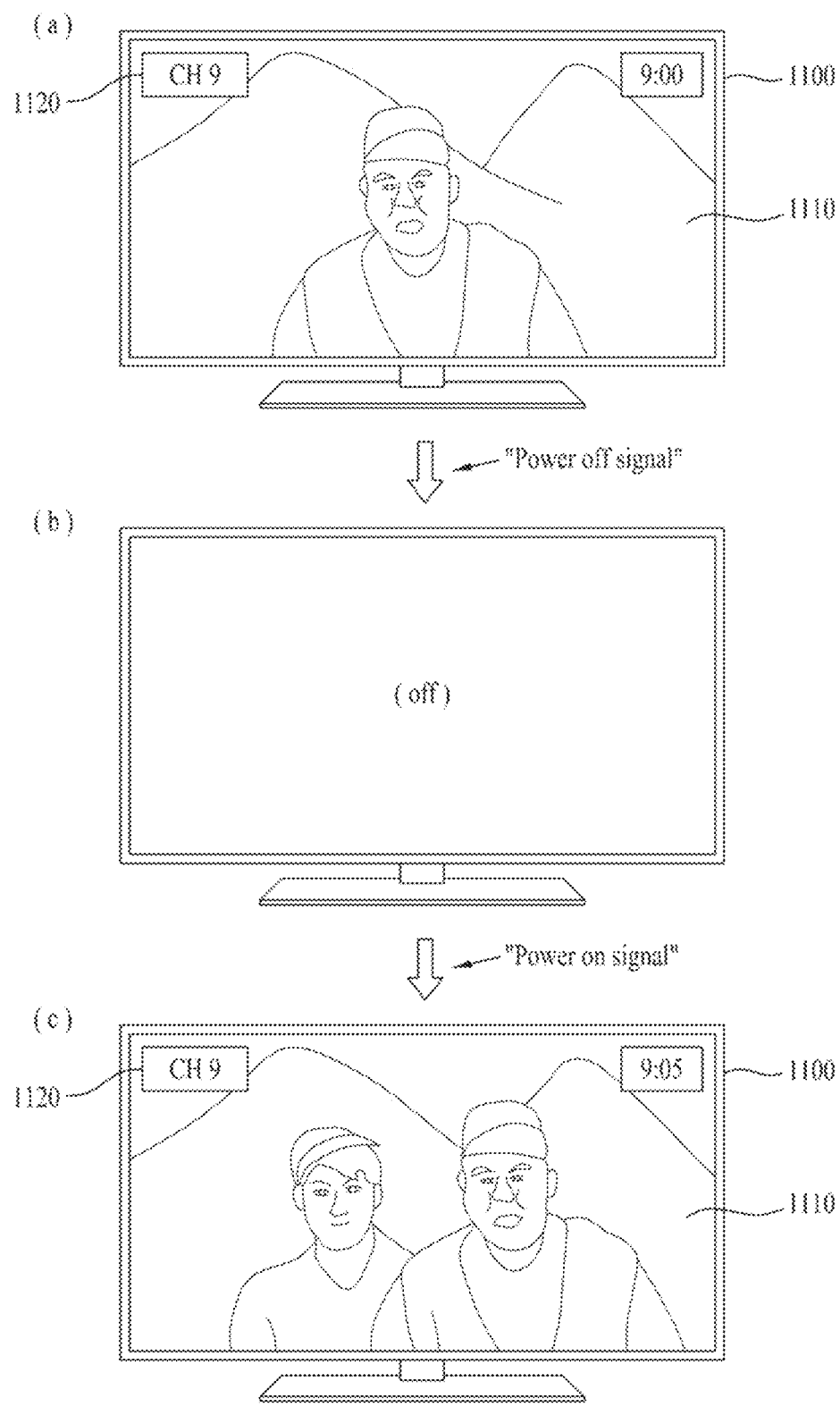
FIG. 11 is a diagram for explaining one example of contiguously displaying displayed first content after a power-on signal is received by a display device according to one embodiment of the present invention in case of receiving a power-off signal.

FIG. 11 is a diagram for explaining one example of contiguously displaying displayed first content after a power-on signal is received by a display device according to one embodiment of the present invention in case of receiving a power-off signal.

A controller of the display device 1100 according to one embodiment of the present invention can control to receive a power-off signal, capture an image of content displayed in a screen when the power-off signal is received, store a system booting file and the captured image in a self-refresh memory block in the memory, receive a power-on signal, boot a system in a manner of extracting the system booting file from the self-refresh memory block and display the captured image in the screen. And the self-refresh memory block may correspond to a memory block activated in a manner of being supplied by a separate power when the power of the display device 1100 is turned off.

And, the content may include a real time broadcast program, a movie, music and an application.

And, in case that the content 1110 corresponds to a real time broadcast program, the controller can control channel information 1120 of the real time broadcast program to be stored in the self-refresh memory block.

Moreover, the controller receives a broadcast program from a channel of the real time broadcast program and can control the broadcast program to be displayed in a screen.

As depicted in FIG. 11(a), if a power-off signal is received via an external input means while a real time broadcast program 1110 is displaying in a screen, the controller of the display device according to one embodiment of the present invention can control channel information 1120 of the real time broadcast program to be stored in the self-refresh memory block. And, as depicted in FIG. 11(b), the controller of the display device 1100 according to one embodiment of the present invention stores the system booting file the channel information 1120 of the real time broadcast program 1110 and data of captured image of the real time broadcast program 1110, which is displayed in a screen when the power-off signal is received, in the self-refresh memory block and may be then able to switch the display device 1100 to a power-off state. And, as depicted in FIG. 11(*c*), if a power-on signal is received, the controller of the display device according to one embodiment of the present invention performs a system booting process of the display device 1100 in a manner of extracting the system booting file from the self-refresh memory block. If the system booting process is completed, the controller receives a broadcast program from the channel of the real time broadcast program 1110 stored in the self-refresh memory block and can control the broadcast program to be displayed in the screen.

FIG. 12 is a diagram for explaining one example of contiguously displaying displayed second content after a power-on signal is received by a display device according to one embodiment of the present invention in case of receiving a power-off signal.

A controller of the display device 1200 according to one embodiment of the present invention can control to receive a power-off signal, capture an image of content displayed in a screen when the power-off signal is received, store a system booting file and the captured image in a self-refresh memory block in the memory, receive a power-on signal, boot a system in a manner of extracting the system booting file from the self-refresh memory block and display the captured image in the screen. And the self-refresh memory block may correspond to a memory block activated in a manner of being supplied by a separate power when the power of the display device 1200 is turned off.

And, the content may include a real time broadcast program, a movie, music and an application.

And, in case that the content 1110 corresponds to a movie, music and an application, the controller can control at least one data among audio data, video data and graphic data of the content to be stored in the self-refresh memory block.

Moreover, the controller can control content displayed when the power-off signal is received to be contiguously displayed using the at least one data among the audio data, the video data and the graphic data of the stored content.

As depicted in FIG. 12(*a*), if a power-off signal is received via an external input means while a movie 1210 is displaying in a screen, the controller of the display device 1200 according to one embodiment of the present invention can control at least one data among audio data, video data and graphic data of the movie 1210 to be stored in the self-refresh memory block. And, as depicted in FIG. 12(*b*), the controller of the display device 1200 according to one embodiment of the present invention stores the system booting file, the at least one data among the audio data, the video data and the graphic data of the movie 1210 and data of captured image of the movie 1210, which is displayed in a screen when the power-off signal is received, in the self-refresh memory block and may be then able to switch the display device 1200 to a power-off state. And, as depicted in FIG. 12 (*c*), it a power-on signal is received, the controller of the display device according to one embodiment of the present invention performs a system booting process of the display device 1200 in a manner of extracting the system booting file from the self-refresh memory block. If the system booting process is completed, the controller can control the movie, which is displayed when the power-off signal is received, to be contiguously displayed in the screen in a manner of extracting the at least one data from the audio data, the video data and the graphic data of the movie 1210 stored in the self-refresh memory block.

FIG. 13 is a diagram for explaining one example of contiguously displaying displayed third content after a power-on signal is received by a display device according to one embodiment of the present invention in case of receiving a power-off signal.

As depicted in FIG. 13(*a*), if a power-off signal is received via an external input means while a music 1310 is displaying in a screen, the controller of the display device 1300 according to one embodiment of the present invention can control at least one data among audio data, video data and graphic data of the music 1310 to be stored in the self-refresh memory block. And, as depicted in FIG. 13(*b*), the controller of the display device 1300 according to one embodiment of the present invention stores the system booting file, the at least one data among the audio data, the video data and the graphic data of the music 1310 and data of captured image of the music 1310, which is displayed in a screen when the power-off signal is received, in the self-refresh memory block and may be then able to switch the display device 1300 to a power-off state. And, as depicted in FIG. 13 (*c*), if a power-on signal is received, the controller of the display device 1300 according to one embodiment of the present invention performs a system booting process of the display device 1300 in a manner of extracting the system booting file from the self-refresh memory block. If the system booting process is completed, the controller can control the music, which is outputted when the power-off signal is received, to be contiguously outputted in the screen in a manner of extracting the at least one data from the audio data, the video data and the graphic data of the music 1310 stored in the self-refresh memory block.

FIG. 14 is a diagram for explaining one example of contiguously displaying displayed fourth content after a power-on signal is received by a display device according to one embodiment of the present invention in case of receiving a power-off signal.

As depicted in FIG. 14(*a*), if a power-off signal is received via an external input means while an application 1410 is displaying in a screen, the controller of the display device 1400 according to one embodiment of the present invention can control at least one data among audio data, video data and graphic data of the application 1410 to be stored in the self-refresh memory block. And, as depicted in FIG. 14(*b*), the controller of the display device 1400 according to one embodiment of the present invention stores the system booting file, the at least one data among the audio data, the video data and the graphic data of the application 1410 and data of captured image of the application 1410, which is displayed in a screen when the power-off signal is received, in the self-refresh memory block and may be then able to switch the display device 1400 to a power-off state. And, as depicted in FIG. 14(*c*), if a power-on signal is received, the controller of the display device 1400 according to one embodiment of the present invention performs a system booting process of the display device 1400 in a manner of extracting the system booting file from the self-refresh memory block. If the system booting process is completed, the controller can control the application, which is outputted when the power-off signal is received, to be contiguously outputted in the screen in a manner of extracting the at least one data from the audio data, the video data and the graphic data of the application 1410 stored in the self-refresh memory block.

FIG. 15 is a diagram for explaining one example of contiguously displaying displayed fifth content after a power-on signal is received by a display device according to one embodiment of the present invention in case of receiving a power-off signal.

As depicted in FIG. 15(a), if a power-off signal is received via an external input means while a web browser 1510 is displaying in a screen, the controller of the display device 1500 according to one embodiment of the present invention can control a website history and the like accessed by the web browser 1510 to be stored in the self-refresh memory block. And, as depicted in FIG. 15(b), the controller of the display device 1400 according to one embodiment of the present invention stores the system booting file, the website history and the like accessed by the web browser 1510 and data of captured image of the web browser 1510, which is displayed in a screen when the power-off signal is received, in the self-refresh memory block and may be then able to switch the display device 1500 to a power-off state. And, as depicted in FIG. 15(c), if a power-on signal is received, the controller of the display device 1500 according to one embodiment of the present invention performs a system booting process of the display device 1500 in a manner of extracting the system booting file from the self-refresh memory block. If the system booting process is completed, the controller can control the web browser 1510, which is outputted when the power-off signal is received, to be contiguously outputted in the screen in a manner of extracting the website history and the like accessed by the web browser 1510 from the self-refresh memory block.

When the display device is designed according to the description mentioned earlier in FIG. 11 to FIG. 15, a user can contiguously use or watch content, which is previously used or watched in the display device, via a screen immediately after a prompt booting.

Figure 16:
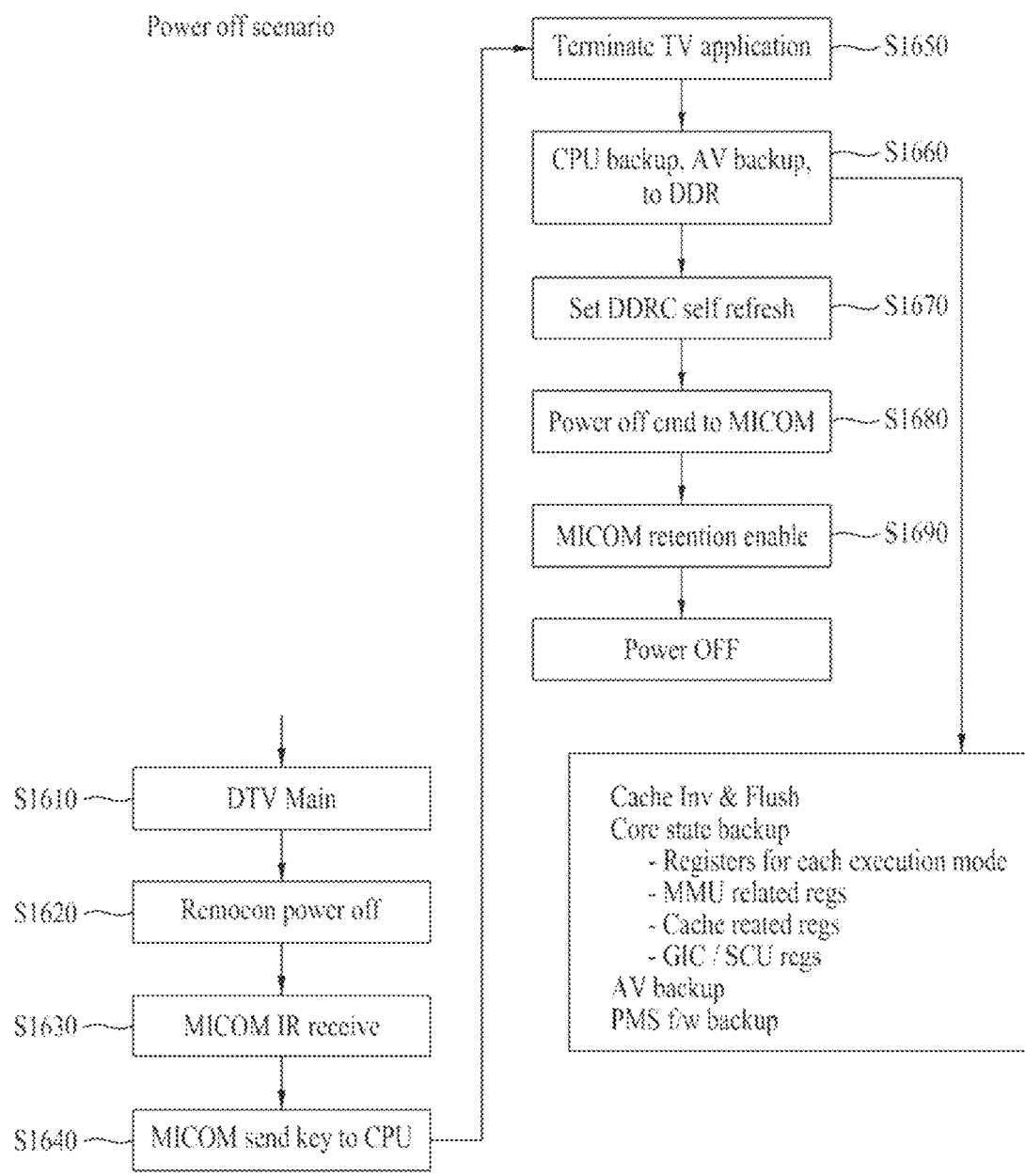
FIG. 16 is a diagram for explaining one example of a power-off process of a display device according to one embodiment of the present invention.

FIG. 16 is a diagram for explaining one example of a power-off process of a display device according to one embodiment of the present invention.

As depicted in FIG. 16, a power-off process of a display device according to one embodiment of the present invention can be configured in a manner of including the step of displaying a real time broadcast program and the like [S1610], the step of generating a power-off signal in a remote controller [S1620], the step of receiving the power-off signal in MICOM [S1630], the step of delivering information on the power-off signal to a controller of the display device by the MICOM [S1640], the step of terminating an application to output the real time broadcast program [S1650], the step of storing a system booting file, an image file and audio data, video data and the like of content in DRAM [S1660], the step of setting a memory block of the DRAM stored the data to a self-refresh memory block [S1670], the step of delivering a power-off command to the MICOM [S1680] and the step of maintaining activation of the MICOM [S1690]. Since detail explanation on each step is identical to what is mentioned earlier in the foregoing description, duplicated explanation is omitted at this time.

Figure 17:
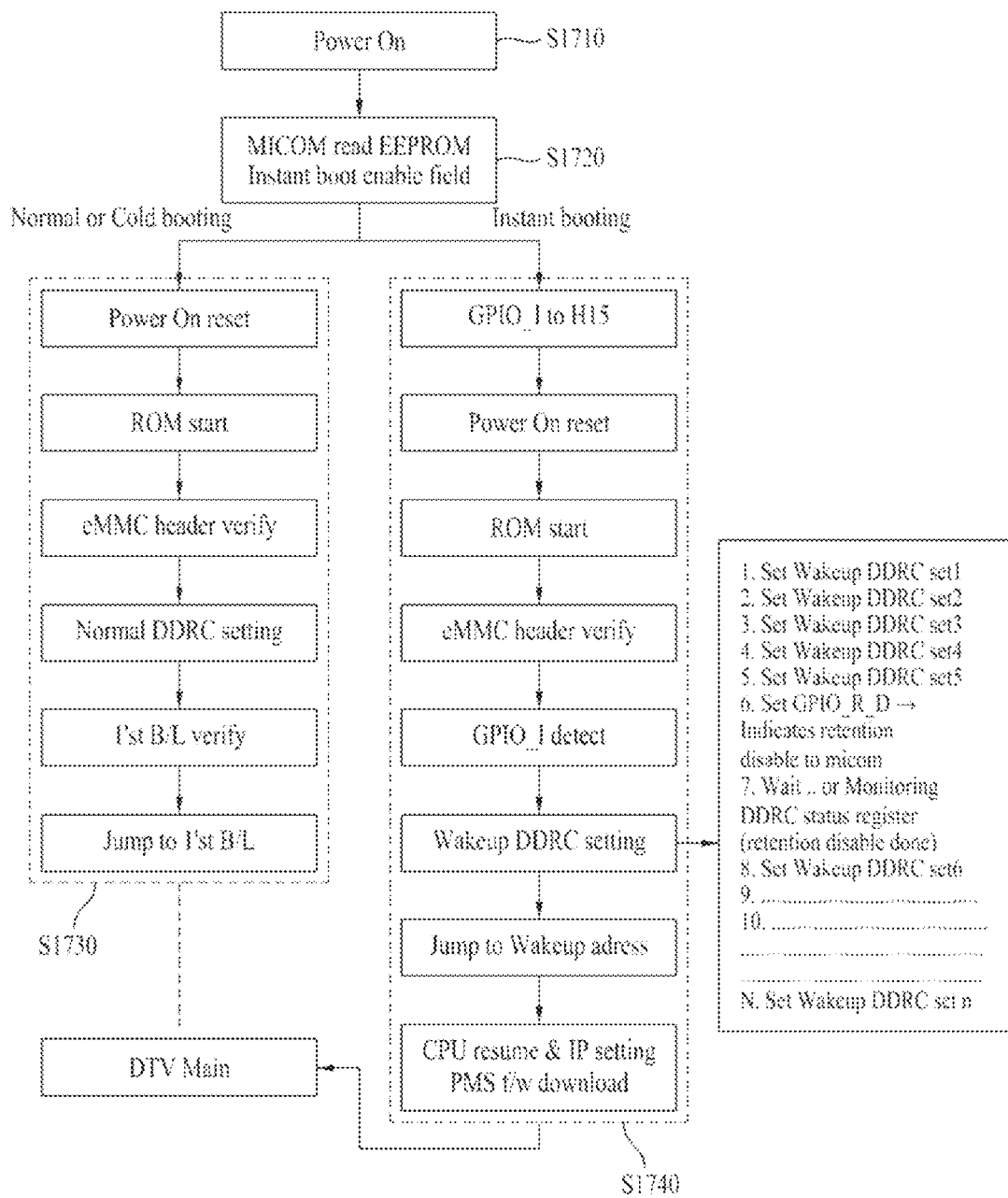
FIG. 17 is a diagram for explaining one example of a power-on process of a display device according to one embodiment of the present invention.

FIG. 17 is a diagram for explaining one example of a power-on process of a display device according to one embodiment of the present invention.

As depicted in FIG. 17, the display device according to one embodiment of the present invention can implement both a legacy power-on process [S1730] and a power-on process [S1740] used for performing a prompt booting process using a self-refresh memory block of the present invention. If the display device in a power-off state receives [S1710] a power-on signal from an external input means and the like, the display device can get ready for performing a power-on process in a manner of extracting a system booting file included in a memory from the memory. Subsequently, the display device can perform the legacy power-on process [S1730] or the power-on process [S1740] using the self-refresh memory block in a manner of selecting one of them according to an option which is configured when a power-off signal is received. Since detail explanation on the power-on process [S1730, S1740] is identical to what is mentioned earlier in the foregoing description, duplicated explanation is omitted at this time.

Figure 18:
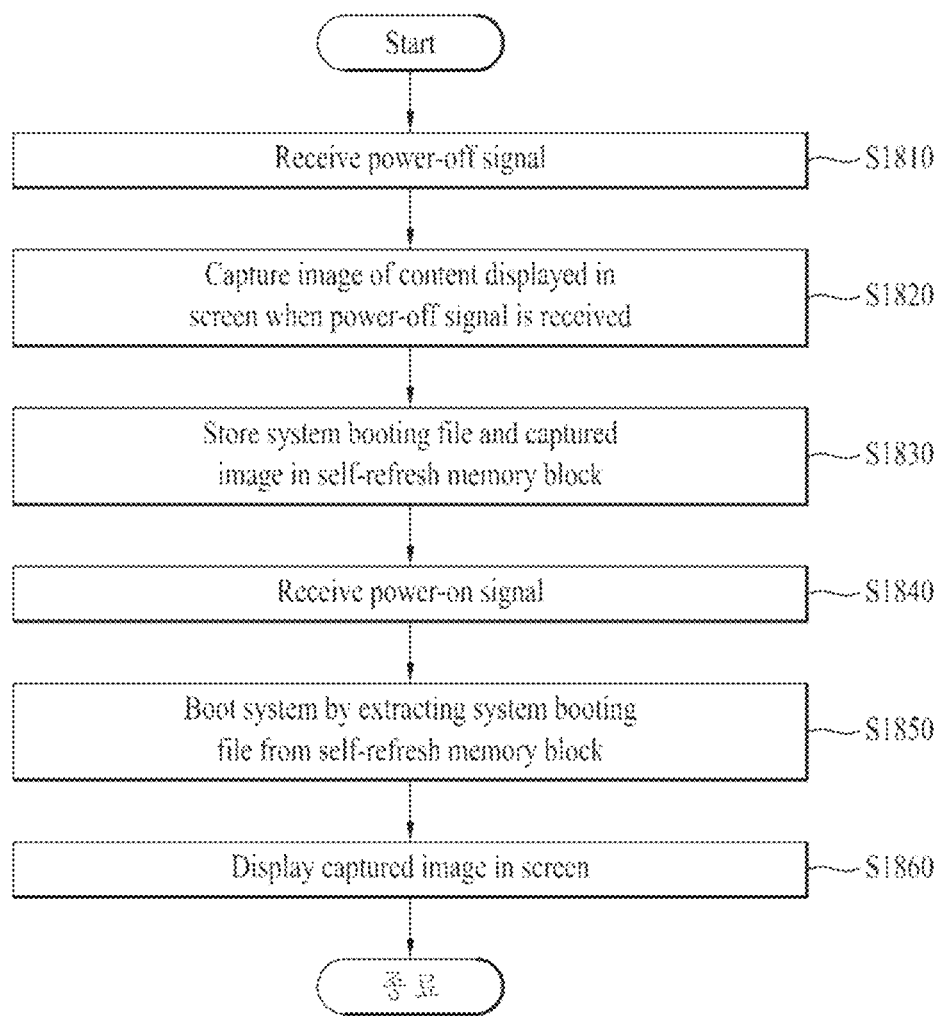
FIG. 18 is a flowchart for a method of controlling a display device according to one embodiment of the present invention.

FIG. 18 is a flowchart for a method of controlling a display device according to one embodiment of the present invention.

As depicted in FIG. 18, a method of controlling a display device according to one embodiment of the present invention can be implemented in a manner of including the step of receiving a power-off signal [S1810], the step of capturing an image of content displayed in a screen when the power-off signal is received [S1820], the step of storing a system booting file and the captured image in a self-refresh memory block [S1830], the step of receiving a power-on signal [S1840], the step of booting a system by extracting the system hooting file from the self-refresh memory block [S1850] and the step of displaying the captured image in the screen [S1860]. Detailed explanation on each step is identical to what is mentioned earlier, duplicated explanation is omitted.

Figure 19:
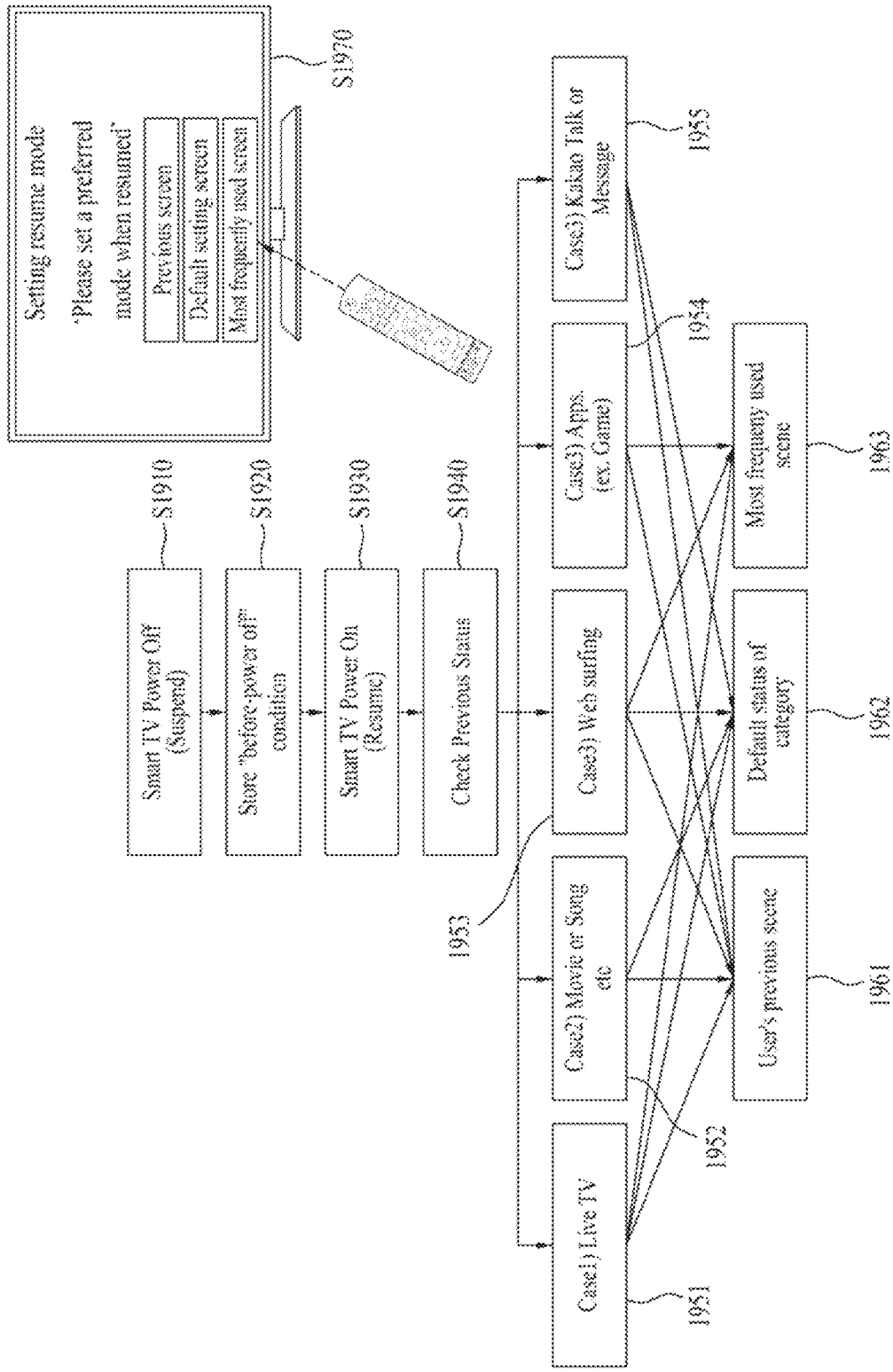
FIG. 19 is a diagram for explaining a self-refresh mode configurable in a display device according to one embodiment of the present invention.

FIG. 19 is a diagram for explaining a self-refresh mode configurable in a display device according to one embodiment of the present invention.

A controller of the display device according to one embodiment of the present invention is configured to receive a power-off signal, store a system booting file and a predetermined snapshot image in a self-refresh memory block based on a predetermined self-refresh mode, receive a power-on signal, boot a system by extracting the system booting file from the self-refresh memory block, and control a display module in the display device to display the predetermined snapshot image.

The self-refresh mode can include a first self-refresh mode for contiguously displaying content, which is displayed by the display module when the power-off signal is received by the controller. After the power-on signal is received, a second self-refresh mode displays by the display module an image configured by default, and a third self-refresh mode executes a specific content, which is selected according to frequency of a user access.

The self-refresh memory block may correspond to a memory block configured to be activated when the display device is turned off (i.e., deactivated).

As depicted in FIG. 19, if a power-off signal is received [S1910], the controller of the display device according to one embodiment of the present invention captures an image of content, which is displayed when the power-off signal is received, and stores data related to the content information and a system booting file in a memory [S1920]. If a power-on signal is received [S1930], the controller can check a state of the display device on timing of receiving the power-off signal [S1940]. In this case, the state of the display device on the timing of receiving the power-off signal may include an image of content, which is displayed when the power-off signal is received, content information, self-refresh mode information, volume information, screen brightness information, speaker channel setting information and the like. The content information can include type information of content, audio data, video data and graphic data of the content. If the content corresponds to a real time broadcast program, the content information can include channel information as well. The self-refresh mode may correspond to at least one of the first self-refresh mode 1961, the second self-refresh mode 1962 and the third self-refresh mode 1963. The self-refresh mode can be configured by a user before the power-off signal is received. Or, the controller of the display device according to one embodiment of the present invention can control a message 1970, which enables a user to select a mode from the self-refresh modes, to be displayed in a screen when the power-off signal is received. If the user selects a specific self-refresh mode via the message 1970, the user can configure the display device with the selected self-refresh mode. In addition, if the self-refresh mode is not configured in advance, the controller of the display device according to one embodiment of the present invention can control the message 1970 to be displayed in the screen when the power-on signal is received. And, the user can select a specific self-refresh mode via the message 1970 after power of the display device is turned on.

As depicted in FIG. 19, the display device according to one embodiment of the present invention can perform operations different from each other according to a self-refresh mode and a type of content. For instance, if content corresponds to a real time broadcast program 1951 and the self-refresh mode is configured by the first self-refresh mode 1961, the controller of the display device according to one embodiment of the present invention can control to receive a power-on signal, boot a system of the display device in a manner of extracting a system booting file from a self-refresh memory block and display the real time broadcast program in the screen in a manner of contiguously receiving the real time broadcast program from a channel, which is received via a tuner when a power-off signal is received. And, if the content corresponds to the real time broadcast program 1951 and the self-refresh mode is configured by the second self-refresh mode 1962, the controller of the display device according to one embodiment of the present invention can control to receive a power-on signal, boot a system of the display device in a manner of extracting a system booting file from a self-refresh memory block and display a predetermined default image in the screen. And, if the content corresponds to the real time broadcast program 1951 and the self-refresh mode is configured by the third self-refresh mode 1963, the controller of the display device according to one embodiment of the present invention can control to receive a power-on signal, boot a system of the display device in a manner of extracting a system booting file from a self-refresh memory block and display a specific content image, which is selected according to frequency of a user access. The specific content, which is selected according to the frequency of the user access, may correspond to a content most frequently executed within a predetermined period. For instance, if a user most frequently executes a specific application within the predetermined period, the controller of the display device according to one embodiment of the present invention can control an image of the specific application to be displayed in a screen after a power-on signal is received. And, if the content, which is displayed when the power-off signal is received, corresponds to a movie, music 1952, a web browser 1953, an application 1954 and a messenger 1955, since the process applied to the real time broadcast program 1951 can be identically applied, duplicated explanation is omitted at this time.

Figure 20:
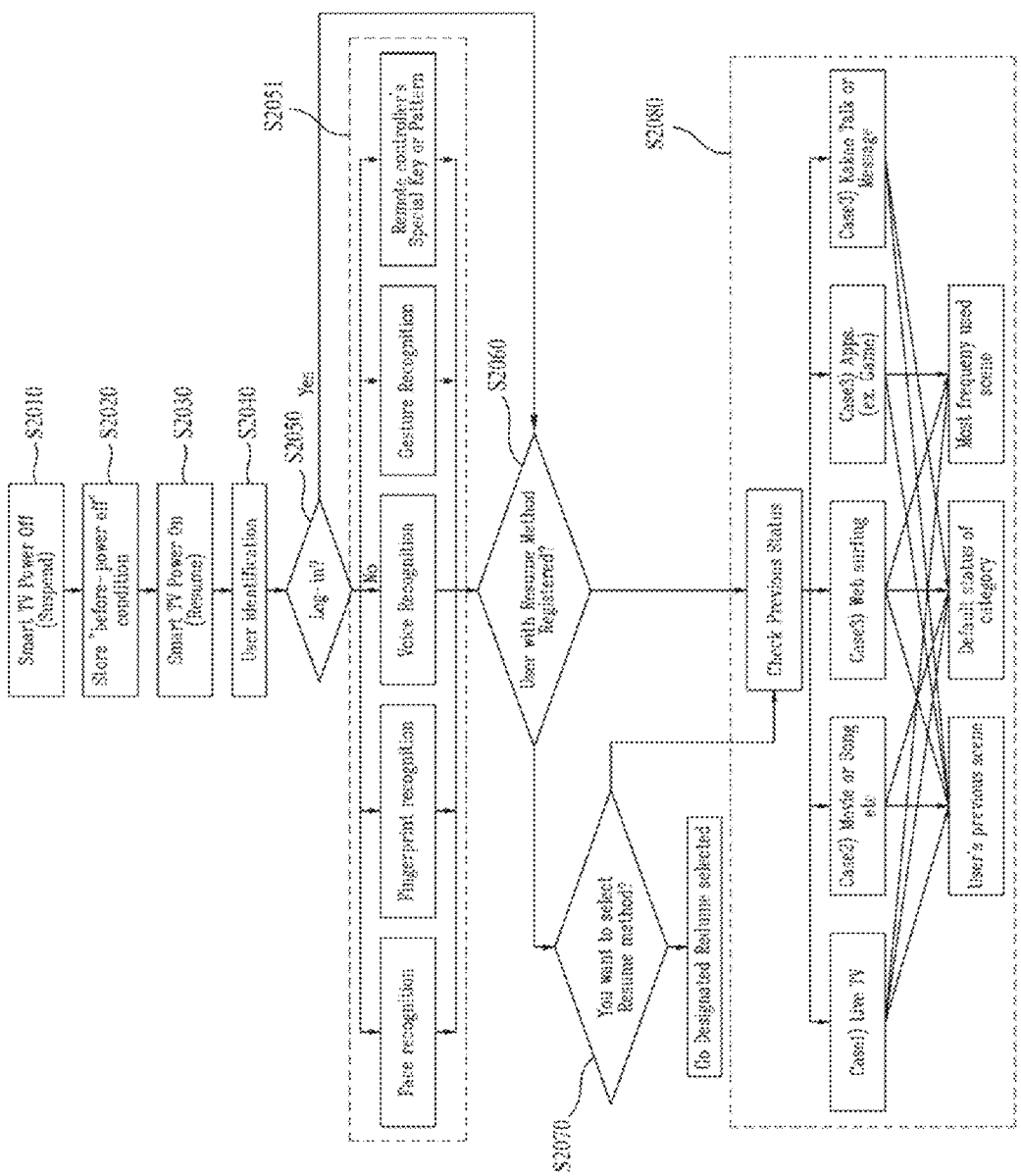
FIG. 20 is a diagram for explaining one example of detecting user information to determine a self-refresh mode in a digital device according to one embodiment of the present invention.

FIG. 20 is a diagram for explaining one example of detecting user information to determine a self-refresh mode in a digital device according to one embodiment of the present invention.

As depicted in FIG. 20, if a power-off signal is received [S2010], the controller of the display device according to one embodiment of the present invention captures an image of content which is displayed when the power-off signal is received and stores data related to the content information and a system booting file in a memory [S2020]. If a power-on signal is received [S2030], the controller performs the step of detecting user information [S2040]. In this case, the controller can check whether a user account is logged in [S2050]. If the user account is logged in, the controller of the display device according to one embodiment of the present invention can read a self-refresh mode stored in the user account. And, if the user account is not logged in, the controller of the display device according to one embodiment of the present invention can control a message used for selecting one of the first self-refresh mode, a second self-refresh mode and a third self-refresh mode to be displayed. Or, if the user account is not logged in, the controller of the display device according to one embodiment of the present invention can perform a process [S2051] of detecting user information. The process [S2051] of detecting the user information can be performed by face recognition, fingerprint recognition, voice recognition, gesture recognition, a method of receiving a specific key or a specific pattern signal from a remote controller or the like. The controller of the display device according to one embodiment of the present invention can determine whether there exists a self-refresh mode configured by a user in advance after the user information is detected by the login of the user account or the user information is detected by performing the process of detecting the user information when the user account is not logged in [S2060]. If the self-refresh mode configured by the user in advance does not exist, the controller of the display device according to one embodiment of the present invention can control a message used for selecting one of the first self-refresh mode, the second self-refresh mode and the third self-refresh mode to be displayed [S2070]. If the self-refresh mode configured by the user in advance exists, the controller of the display device according to one embodiment of the present invention can perform an operation according to the predetermined self-refresh mode [S2080]. As mentioned earlier in FIG. 19, the step S2080 may perform operations different from each other according to a self-refresh mode and a content type and an identical process can be applied. Hence, duplicated explanation is omitted at this time.

In case of designing the display device according to the description mentioned in FIG. 19 and FIG. 20, the display device can perform a prompt booting process and can display a screen preferred by a user immediately after the booting of the display device.

Figure 21:
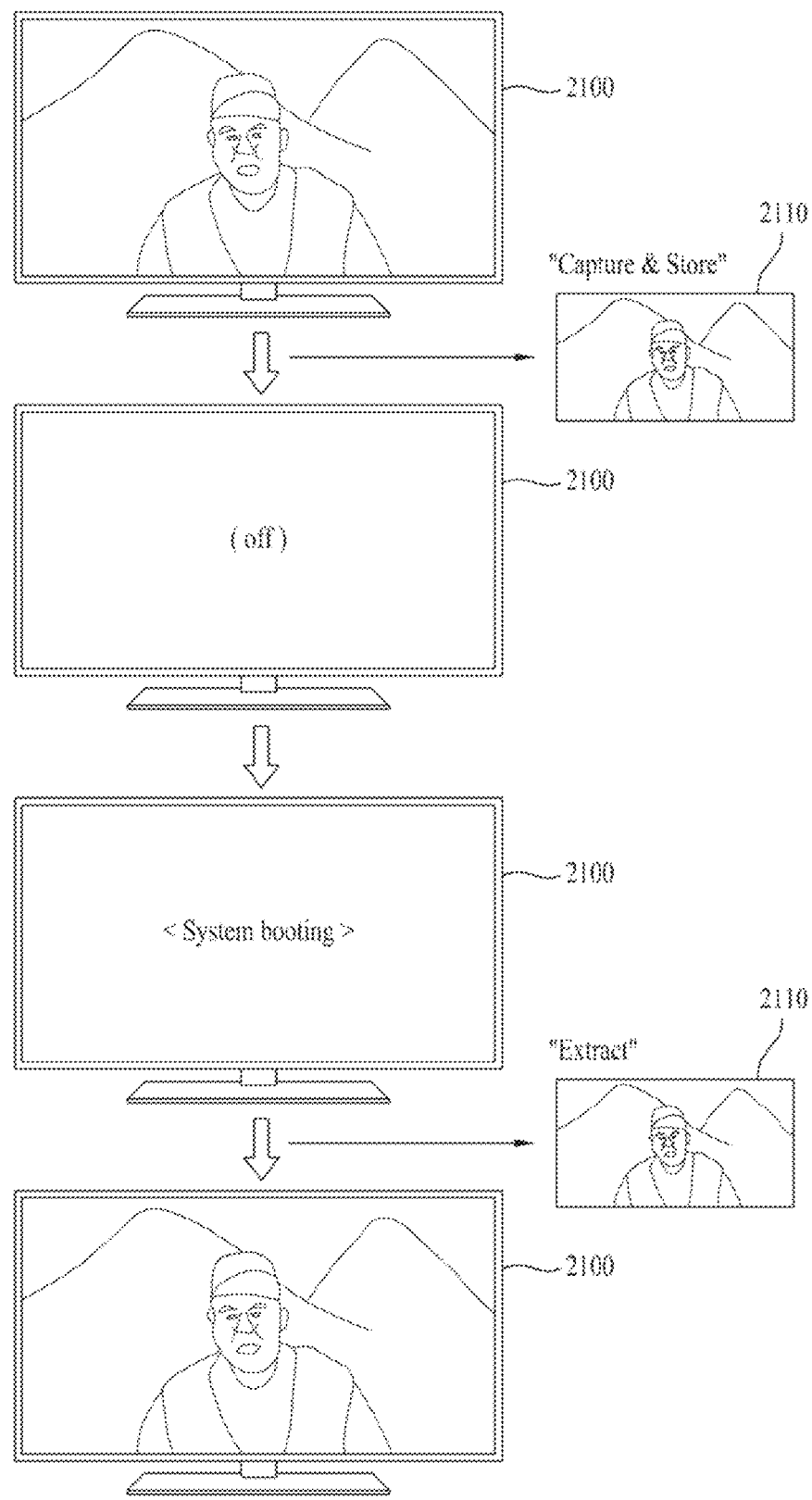
FIG. 21 is a diagram for explaining one example of a display device operating according to a first self-refresh mode in accordance with one embodiment of the present invention.

FIG. 21 is a diagram for explaining one example of a display device operating according to a first self-refresh mode in accordance with one embodiment of the present invention.

As depicted in FIG. 21, if a power-off signal is received, the controller of the display device 2100 according to one embodiment of the present invention can control to capture an image 2110 of displayed content and store the captured image and a system booting file in a self-refresh memory block. If a power-on signal is received, the controller of the display device 2100 can control to boot a system of the display device 2100 in a manner of extracting the system booting file from the self-refresh memory block. If a predetermined self-refresh mode corresponds to a first self-refresh mode, the controller can control the captured image 2110 to be displayed in a screen. And, the controller of the display device 2100 can control the content, which is displayed when the power-off signal is received, to be contiguously executed.

Figure 22:
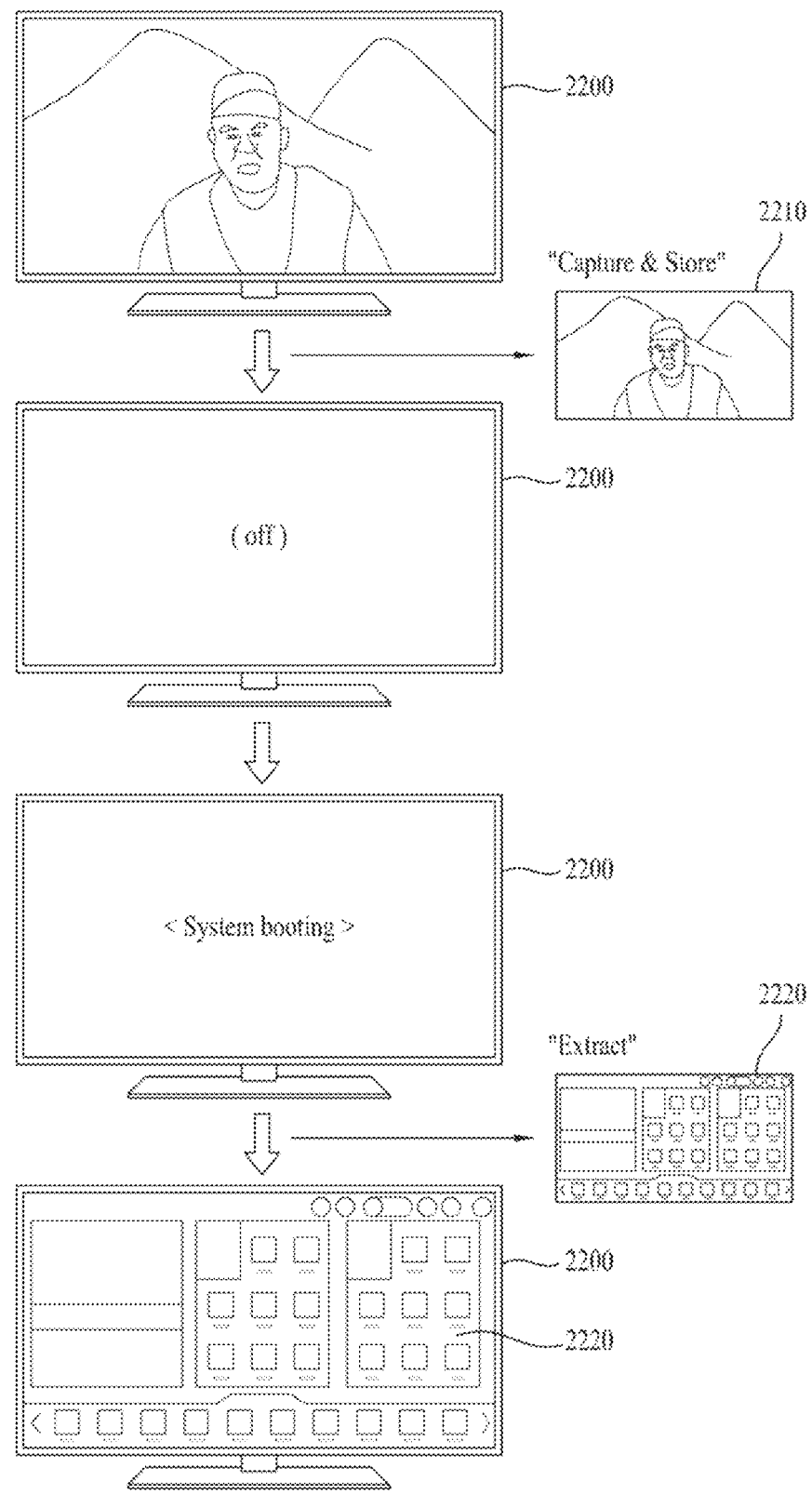
FIG. 22 is a diagram for explaining one example of a display device operating according to a second self-refresh mode in accordance with one embodiment of the present invention.

FIG. 22 is a diagram for explaining one example of a display device operating according to a second self-refresh mode in accordance with one embodiment of the present invention.

If a power-off signal is received, the controller of the display device 2200 according to one embodiment of the present invention can control to capture an image 2210 of displayed content and store the captured image and a system booting file in a self-refresh memory block. If a power-on signal is received, the controller of the display device 2200 can control to boot a system of the display device 2200 in a manner of extracting the system booting file from the self-refresh memory block. If a predetermined self-refresh mode corresponds to a second self-refresh mode, the controller can control a predetermined snapshot image 2220 to be displayed in a screen instead of displaying the captured image 2210. The predetermined snapshot image 2220 may correspond to an image configured by default and the image configured by default may correspond to a home image of the display device. The image configured by default can be updated with a predetermined period. And, when the power-off signal is received, the controller of the display device 2200 can control content corresponding to the predetermined snapshot image 2220 to be executed instead of contiguously executing the content, which is displayed when the power-off signal is received.

Figure 23:
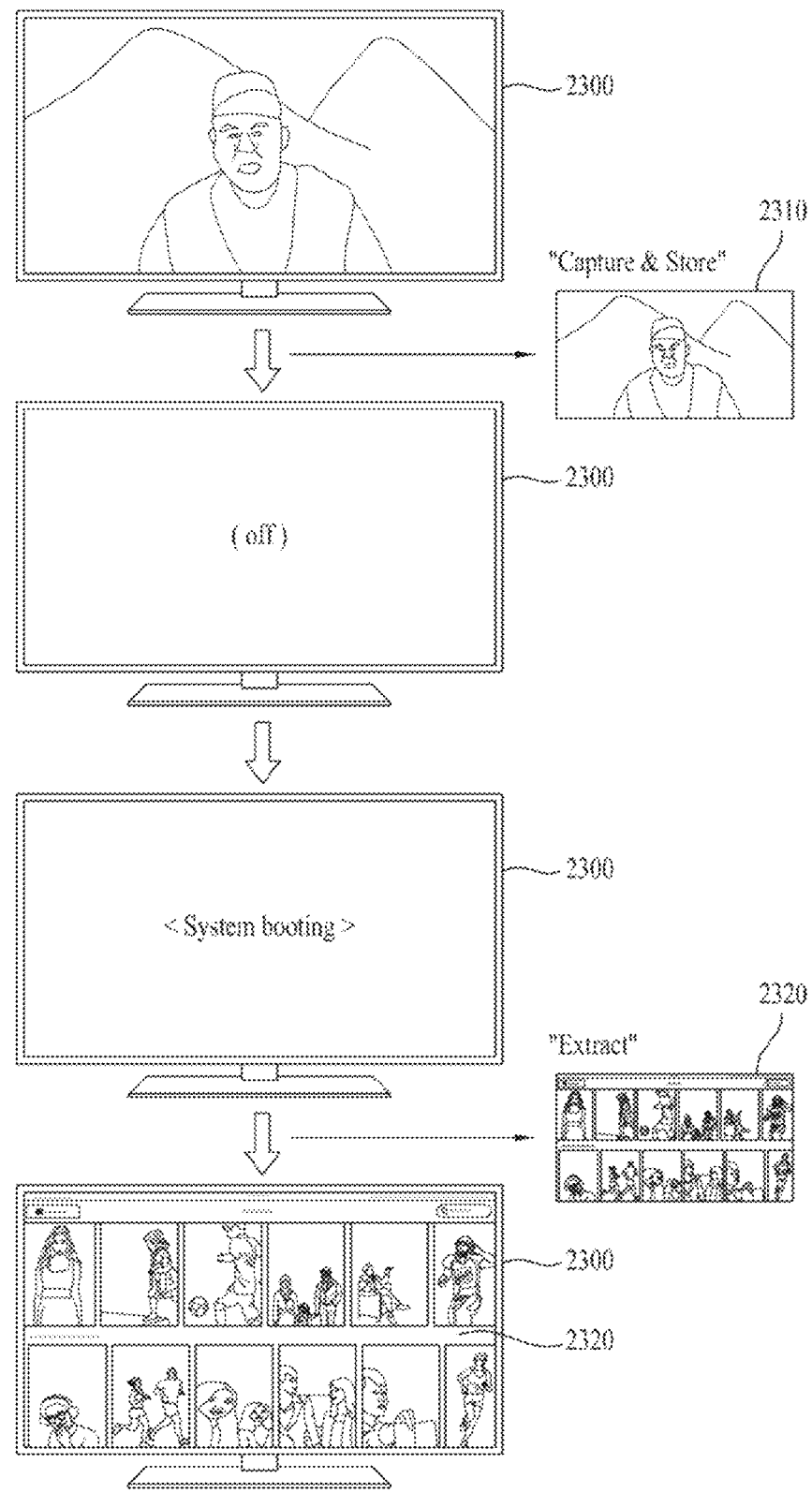
FIG. 23 is a diagram for explaining one example of a display device operating according to a third self-refresh mode in accordance with one embodiment of the present invention.

FIG. 23 is a diagram for explaining one example of a display device operating according to a third self-refresh mode in accordance with one embodiment of the present invention.

If a power-off signal is received, the controller of the display device 2300 according to one embodiment of the present invention can control to capture an image 2310 of displayed content and store the captured image and a system booting file in a self-refresh memory block. If a power-on signal is received, the controller of the display device 2300 can control to boot a system of the display device 2300 in a manner of extracting the system booting file from the self-refresh memory block. If a predetermined self-refresh mode corresponds to a third self-refresh mode, the controller can control a predetermined snapshot image 2320 to be displayed in a screen instead of displaying the captured image 2310. The predetermined snapshot image 2320 may correspond to an image of specific content and the specific content can be selected according to frequency of a user access. The controller of the display device 2300 can control the specific content, which is selected according to the frequency of the user access, to be executed instead of contiguously executing the content, which is displayed when the power-off signal is received.

Figure 24:
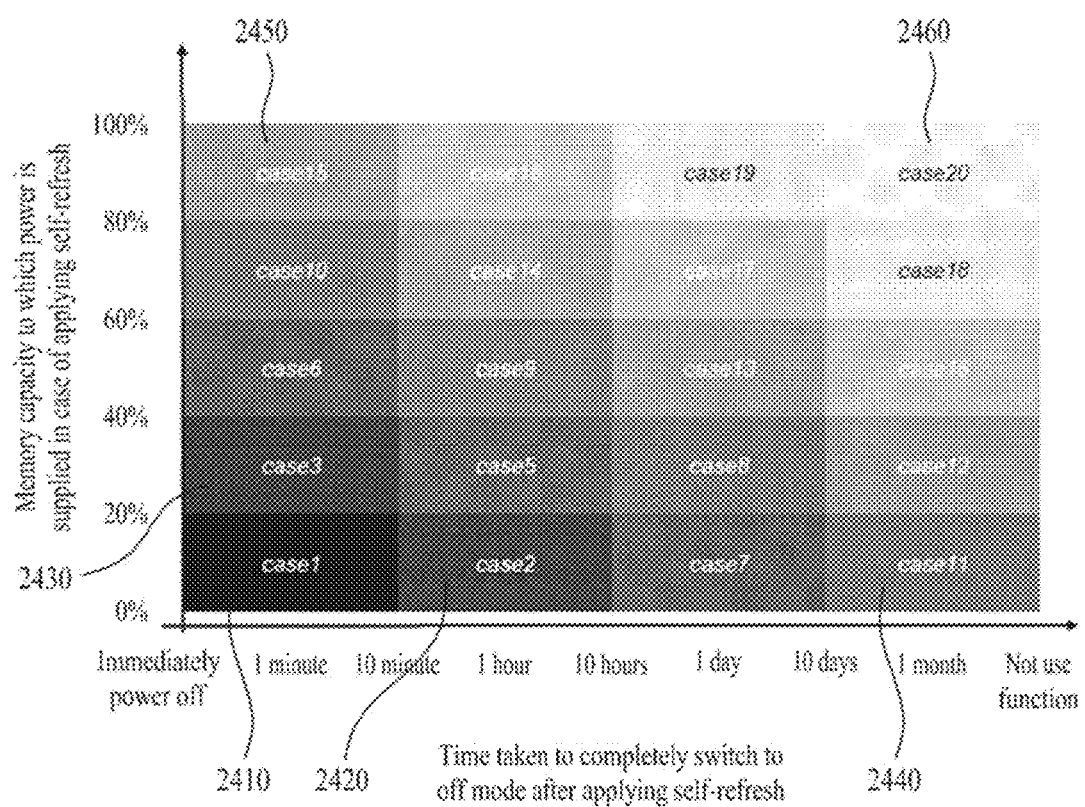
FIG. 24 is a diagram for explaining one example of changing a duration of a self-refresh mode changed by a display device according to one embodiment of the present invention.

FIG. 24 is a diagram for explaining one example of changing a duration of a self-refresh mode by a display device according to one embodiment of the present invention.

The display device according to one embodiment of the present invention can change application time of a self-refresh mode and allocation of memory capacity according to a user setting or a pattern analysis to minimize consumption of electrical power of a self-refresh memory block. For instance, in case of a first case 2410, the self-refresh mode can be terminated in less than 10 minutes while the memory capacity of the self-refresh memory block is set to 20%. And, in case of a second case 2420, the self-refresh mode can be maintained for more than 10 minutes and less than 10 hours while the memory capacity of the self-refresh memory block is set to 20%. On the contrary, in case of a third case 2430, the self-refresh mode can be terminated in 10 minutes while the memory capacity of the self-refresh memory block is set to 40%. And, in case of a fourth case 2440, the self-refresh mode can be continuously maintained without being terminated while the memory capacity of the self-refresh memory block is set to 20%. And, in case of a fifth case 2450, although the capacity of the self-refresh memory block can be allocated up to 100%, the self-refresh mode can be terminated in less than 10 minutes. Lastly, in case of a sixth case 2460, the capacity of the self-refresh memory block is fully allocated up to 100% and the self-refresh mode can be continuously maintained without being terminated. Since data capacity to be stored in the self-refresh memory block is different from each other according to every user and an interval of using the self-refresh mode and a pattern of using the self-refresh mode are different from each other, if the display device is designed according to the description mentioned in FIG. 24, consumption of electrical power consumed by the self-refresh mode can be efficiently managed.

Figure 25:
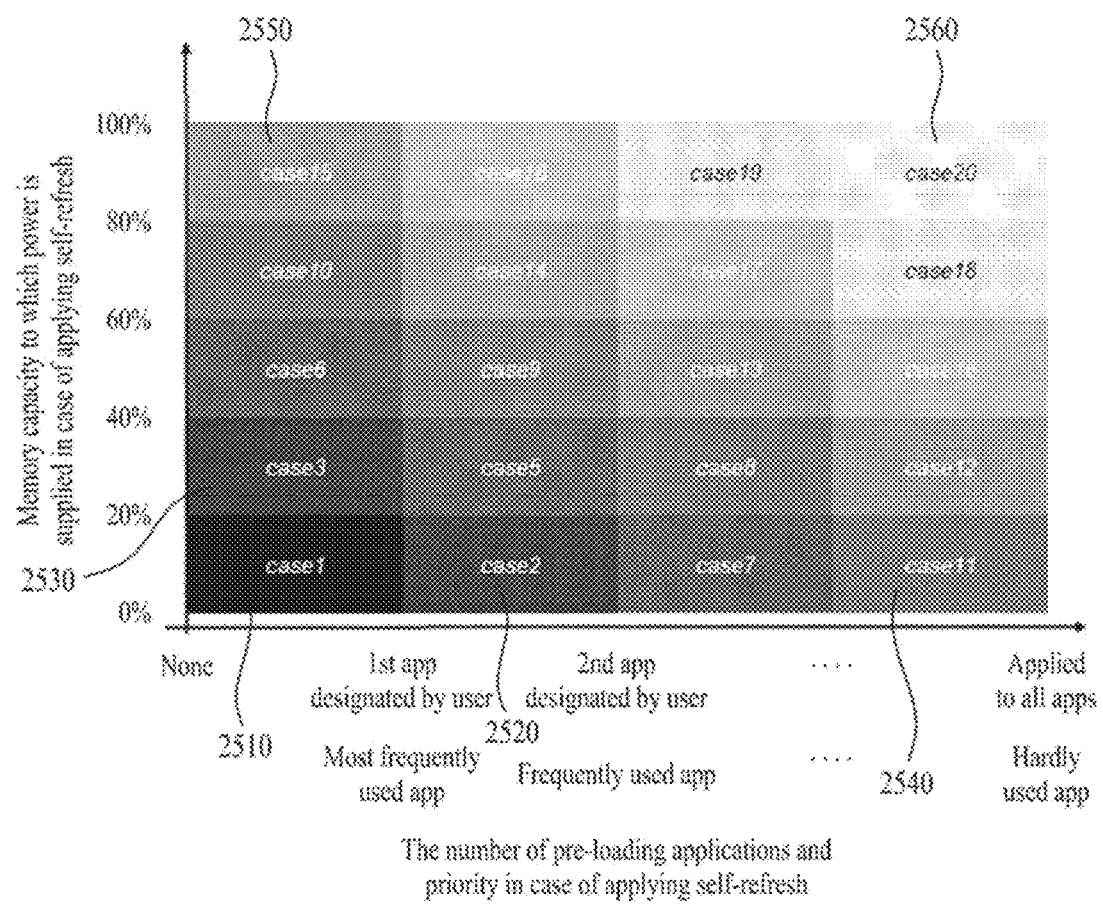
FIG. 25 is a diagram for explaining one example of changing the number of content to which a self-refresh mode to be applied changed by a display device according to one embodiment of the present invention.

FIG. 25 is a diagram for explaining one example of changing the number of content to which a self-refresh mode to be applied changed by a display device according to one embodiment of the present invention.

The display device according to one embodiment of the present invention can designate one or more contents to be executed after a booting is completed while simultaneously performing a prompt booting process using a self-refresh mode. The one or more contents can be stored in a self-refresh memory block. Moreover, the one or more contents can be selected by a user or can be automatically selected based on a user access frequency data. For instance, in case of a first case 2510, the self-refresh mode can be applied to one content while a memory capacity of the self-refresh memory block is set to 20%. And, in case of a second case 2520, the self-refresh mode can be applied to two contents while the memory capacity of the self-refresh memory block is set to 20%. On the contrary, in case of a third case 2530, the self-refresh mode can be applied to one content while the memory capacity of the self-refresh memory block is set to 40%. And, in case of a fourth case 2510, the self-refresh mode can be applied to all contents while the memory capacity of the self-refresh memory block is set to 20%. And, in case of a fifth case 2550, the self-refresh mode can be applied to one content only while the memory capacity of the self-refresh memory block is fully allocated up to 100%. Lastly, in case of a sixth case 2560, the self-refresh mode can be applied to all contents while the memory capacity of the self-refresh memory block is fully allocated up to 100%. Since the number of contents to which the self-refresh mode is applied and data capacity to be stored in the memory block are different from each other according to every user, if the display device is designed according to the description mentioned in FIG. 25, a user can select content to which the self-refresh mode is preferentially applied.

Figure 26:
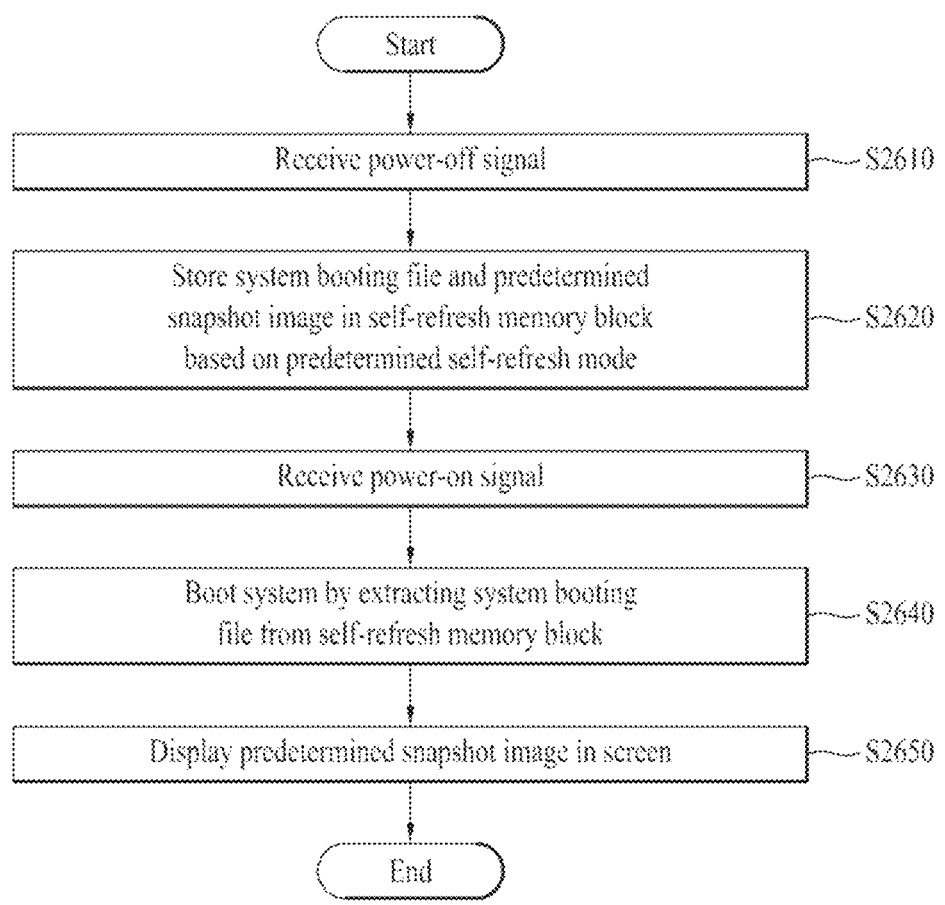
FIG. 26 is a flowchart for a method of controlling a display device according to a different embodiment of the present invention.

FIG. 26 is a flowchart for a method of controlling a display device according to a different embodiment of the present invention.

As depicted in FIG. 26, a method of controlling a display device according to a different embodiment of the present invention can include the steps of receiving a power-off signal [S2610], storing a system booting file and a predetermined snapshot image in a self-refresh memory block based on a predetermined self-refresh mode [S2620], receiving a power-on signal [S2630], booting a system in a manner of extracting the system booting file from the self-refresh memory block [S2640] and displaying the predetermined snapshot image in a screen. Since detailed explanation on each step is identical to what is mentioned earlier in the foregoing description, repetitive explanation is omitted at this time.

For clarity of explanation, each diagram is explained in a manner of being divided. Yet, it is possible to design a new embodiment, to implement the new embodiment by combining the embodiments, which are described in each of the diagrams. And, a display device and a method of controlling therefor according to one embodiment may not limitedly apply to the composition and method of the aforementioned embodiments. The aforementioned embodiments may be configured in a manner of being selectively combined the whole of the embodiments or a part of the embodiments to achieve various modifications.

While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present invention. Thus, it is intended that the present invention covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:

1. A method of controlling an operation of a display device, the method comprising:
   receiving a power-off signal;
   storing a system booting file and a predetermined snapshot image in a self-refresh memory block based on a predetermined self-refresh mode;
   receiving a power-on signal;
   booting a system by extracting the system booting file from the self-refresh memory block; and
   controlling, by a controller, a display module in the display device to display the predetermined snapshot image,
   wherein a content is contiguously displayed by the display module when the power-off signal is received,
   wherein an image configured by default is displayed by the display module after the power-on signal is received,
   wherein a specific application is executed which is selected according to a user access frequency to display a specific content image of the specific application by the display module, and
   wherein the self-refresh memory block corresponds to a memory block configured to be activated when the display device is deactivated.

2. The method of claim 1, further comprising:
   checking whether a user account is logged in.

3. The method of claim 2, further comprising:
   reading a self-refresh mode stored in the user account if the user account is logged in.

4. The method of claim 2, further comprising:
   displaying a message for selecting one of a plurality of self-refresh modes by the display module if the user account is not logged in.

5. The method of claim 1, wherein the predetermined snapshot image corresponds to an image of the content displayed by the display module when the power-off signal is received.

6. The method of claim 1, wherein the predetermined snapshot image corresponds to the image configured by default, which corresponds to a home image.

7. The method of claim 6, wherein the image configured by default is updated within a predetermined interval.

8. The method of claim 1, wherein the predetermined snapshot image corresponds to an image of the specific application, which is selected according to the user access frequency and corresponds to a most frequently executed content within a predetermined period.

9. The method of claim 1, further comprising:
   reading application data containing priority information after the predetermined snapshot image is displayed by the display module.

10. The method of claim 1, wherein controller is included in the display device.

11. A display device, comprising:
    a memory including a self-refresh memory block;
    a display module; and
    a controller configured to control an operation of the display device,
    wherein the controller is configured to receive a power-off signal, store a system booting file and a predetermined snapshot image in the self-refresh memory block based on a predetermined self-refresh mode, receive a power-on signal, boot a system by extracting the system booting file from the self-refresh memory block, and control the display module to display the predetermined snapshot image,
    wherein a content is contiguously displayed by the display module when the power-off signal is received,
    wherein an image configured by default is displayed on the display module after the power-on signal is received,
    wherein a specific application is executed which is selected according to a user access frequency to display a specific content image of the specific application by the display module, and
    wherein the self-refresh memory block corresponds to a memory block configured to be activated when the display device is deactivated.

12. The display device of claim 11, wherein the controller is further configured to check whether a user account is logged in.

13. The display device of claim 12, wherein if the user account is logged in, the controller is configured to read a self-refresh mode stored in the user account.

14. The display device of claim 12, wherein if the user account is not logged in, the controller is configured to control the display module to display a message for selecting one of a plurality of self-refresh modes.

15. The display device of claim 11, wherein the predetermined snapshot image corresponds to an image of the content displayed by the display module when the power-off signal is received.

16. The display device of claim 11, wherein the predetermined snapshot image corresponds to the image configured by default, which corresponds to a home image.

17. The display device of claim 16, wherein the image configured by default is updated within a predetermined interval.

18. The display device of claim 11, wherein the predetermined snapshot image corresponds to an image of the specific application, which is selected according to the user access frequency and corresponds to a most frequently executed content within a predetermined period.

19. The display device of claim 11, wherein the controller is configured to read application data containing priority information after the predetermined snapshot image is displayed by the display module.

20. The display device of claim 11 further comprising:
a reception unit in communication with the controller, the reception unit configured to receive at least one of an infrared (IR) signal and a radio frequency (RF) signal from an external electronic device.

* * * * *